US012808433B2

(12) United States Patent
Bernoegger et al.

(10) Patent No.: US 12,808,433 B2
(45) Date of Patent: Nov. 24, 2026

(54) AXLE ASSEMBLY DEVICES, SYSTEMS, AND METHODS

(71) Applicant: ArvinMeritor Technology, LLC, Troy, MI (US)

(72) Inventors: Johannes Bernoegger, Steyr (AT); Christian Grosstesner, Ternberg (AT); Gerhard Zehetgruber, Schwertberg (AT); Bernhard Auer, Steyr (AT)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 19/179,929

(22) Filed: Apr. 15, 2025

(65) Prior Publication Data

US 2026/0160322 A1 Jun. 11, 2026

Related U.S. Application Data

(60) Provisional application No. 63/634,456, filed on Apr. 15, 2024.

(51) Int. Cl.

| | |
|---|---|
| ***F16H 57/023*** | (2012.01) |
| ***B60K 1/00*** | (2006.01) |
| ***B60K 17/08*** | (2006.01) |
| ***F16H 37/08*** | (2006.01) |
| ***F16H 57/021*** | (2012.01) |
| ***F16H 57/031*** | (2012.01) |
| ***F16H 57/037*** | (2012.01) |
| *F16H 57/02* | (2012.01) |

(52) U.S. Cl.

CPC ............. *F16H 57/023* (2013.01); *B60K 1/00* (2013.01); *B60K 17/08* (2013.01); *F16H 37/0813* (2013.01); *F16H 57/021* (2013.01); *F16H 57/031* (2013.01); *F16H 57/037* (2013.01); *B60K 2001/001* (2013.01); *F16H 2057/02034* (2013.01); *F16H 2057/02052* (2013.01)

(58) Field of Classification Search

CPC .... F16H 57/023; F16H 57/021; F16H 57/031; F16H 57/037; F16H 2057/02034; F16H 2057/02052; B60K 1/00; B60K 2001/001; B60K 17/08

See application file for complete search history.

(56) References Cited

U.S. PATENT DOCUMENTS

| | | | | |
|---|---|---|---|---|
| 11,273,700 | B2 * | 3/2022 | Garcia | F16C 19/06 |
| 11,453,288 | B2 * | 9/2022 | Nagpal | B62D 25/082 |
| 11,679,657 | B1 * | 6/2023 | Atqiaee | B60K 1/00 475/150 |
| 11,833,898 | B2 * | 12/2023 | Engerman | B60K 1/00 |
| 2017/0087984 | A1 * | 3/2017 | Nieman | B60K 17/36 |
| 2019/0078675 | A1 * | 3/2019 | Slesinski | F16H 48/38 |
| 2019/0351762 | A1 * | 11/2019 | Yang | F16H 57/037 |
| 2020/0047615 | A1 * | 2/2020 | Eschenburg | F16H 1/28 |

(Continued)

*Primary Examiner* — Farhana Pervin
(74) *Attorney, Agent, or Firm* — Brooks Kushman P.C.

(57) ABSTRACT

An e-axle assembly includes a carriage configured to carry internal components that are designed to unitarily connect to an axle housing. The internal components include a transmission assembly configured to be operatively powered by an electric motor, a shifting assembly configured to shift between gears of the transmission assembly, and a differential assembly configured to transmit torque from the transmission assembly to at least one axle of the e-axle assembly.

16 Claims, 19 Drawing Sheets

(56) References Cited

U.S. PATENT DOCUMENTS

| | | | | |
|---|---|---|---|---|
| 2020/0247236 | A1* | 8/2020 | Hirao | B60K 17/046 |
| 2021/0102610 | A1* | 4/2021 | Ghatti | F16H 37/0813 |
| 2021/0362577 | A1* | 11/2021 | Laforce | B60K 1/00 |
| 2022/0161645 | A1* | 5/2022 | Trost | B60K 1/00 |
| 2023/0110432 | A1* | 4/2023 | Laforce | F16H 57/029 310/54 |
| 2023/0311820 | A1* | 10/2023 | Fox | F16H 63/345 475/150 |
| 2023/0392672 | A1* | 12/2023 | Cattoor | B60K 17/08 |

* cited by examiner

| GEAR | A | B | C | D | E | F |
|---|---|---|---|---|---|---|
| N | | X | | X | | |
| 1. | | | X | X | | |
| 2. | X | | | X | | |
| N1 | X | | | | X | |
| 3. | X | | | | | X |

• SPLIT GROUP RATIO 1+2
• TRANSMISSION STAGE 1

| GEAR | A | B | C | D | E | F |
|---|---|---|---|---|---|---|
| N | | X | | X | | |
| 1. | | | X | X | | |
| 2. | X | | | X | | |
| N1 | X | | | | X | |
| 3. | X | | | | | X |

RATIO RANGE 1:
43/21*41/25*65/28=
7,796

- SPLIT GROUP RATIO 1+2
- TRANSMISSION STAGE 2+3

| GEAR | A | B | C | D | E | F |
|---|---|---|---|---|---|---|
| N | | X | | X | | |
| 1. | | | X | X | | |
| 2. | X | | | X | | |
| N1 | X | | | | X | |
| 3. | X | | | | | X |

RATIO RANGE 2:
43/21*41/25*37/33=
3,765

• SPLIT GROUP RATIO 3
• TRANSMISSION STAGE 2+3

| GEAR | A | B | C | D | E | F |
|---|---|---|---|---|---|---|
| N | | X | | X | | |
| 1. | | | X | X | | |
| 2. | X | | | X | | |
| N1 | X | | | | X | |
| 3. | X | | | | | X |

RATIO RANGE 3:
35/21*37/33=
1,869

AXLE ASSEMBLY DEVICES, SYSTEMS, AND METHODS

CROSS-REFERENCE TO RELATED APPLICATION

This application claims priority to U.S. Provisional Patent Application No. 63/634,456, filed Apr. 15, 2024, the entire disclosure of which is hereby incorporated by reference in its entirety.

TECHNICAL FIELD

The present disclosure generally relates to axle assemblies, and in particular, compact axle assemblies include an electric motor and a multistage reduction gear set that transmits torque from the electric motor to a differential.

BACKGROUND

High demands for electric driven and hybrid electric assisted vehicles have driven innovation in the industry. Hybrid electric vehicles use electric motor driven axles, which can be implemented in multi-axle configurations in vehicle systems such as military and specialty platforms. Primarily sized to meet both torque and speed requirements, these electric motors may not be the most effective or size-efficient for the operational requirements of such vehicles. For instance, large electric motors used to meet the torque requirements may result in an oversized motor for most operational conditions. Moreover, the large electric motors may be difficult to package in a multi-axle vehicle configuration as their footprint can encroach on otherwise usable space or cause otherwise absent design constraints.

DETAILED DESCRIPTION

Figure 1:
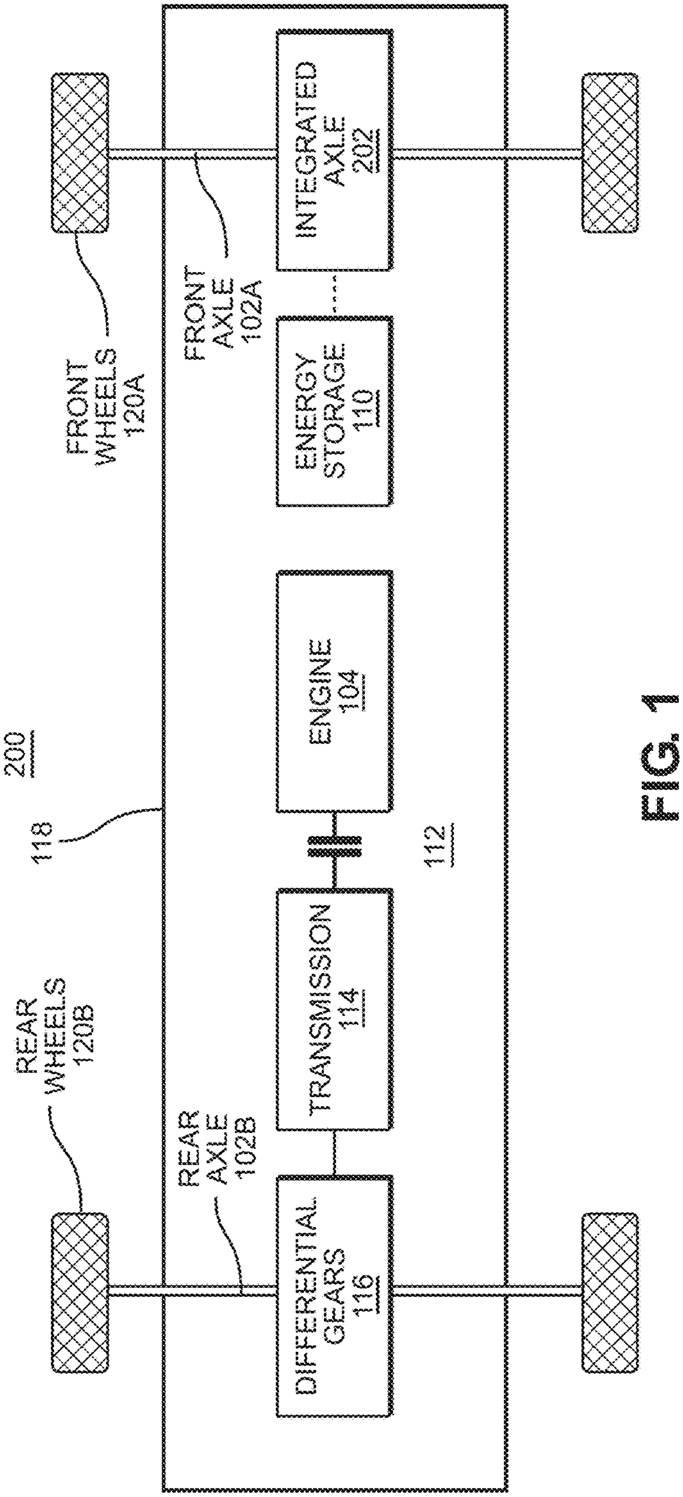
FIG. 1 is a schematic diagram of a dual-axle multi-mode adjustable hybrid vehicle system with integrated front axle.

For purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings. It is not beyond the scope of this disclosure to have a number (e.g., all) the features in a given embodiment to be used across all embodiments.

The present disclosure generally relates to compact eAxles and ePowertrains. More specifically, the present disclosure related to axle assemblies and related devices, systems, and methods having compact rotor bearings, high speed gear ratios, and/or wheel end reduction. Principles of the present disclosure use a combination of design considerations to provide an easy-to-assemble, compact, and/or lubriciously efficient eAxle. For instance, implementations of the principles include an eAxle with a cartridge housing structure that solves axle housing machining issues by providing an overall housing structure that comprises a carrier housing structure that includes an electric motor (or "eMotor") side transmission and a shifting assembly portion to form a transmission cartridge.

First highlighting the cartridge housing structure (sometimes referred to herein in whole or in part as a carriage, carriage assembly, or similar) in further detail, the present disclosure provides an efficient manner for building an eAxle. In existing eAxles, the main axle housing is a sandwich housing which is open on two opposing sides. On the first side, the eMotor side housing is assembled to this axle housing and on the second side the carrier housing including the transmission. As one part of the overall transmission, the shifting assembly is included on the first side (eMotor side housing) and the other part of the transmission and shifting assembly is included in the second side (carrier side). This stack requires a very good precision tolerance of the axle housing thickness, which is difficult to machine for such a big and flexible part. Further a precise parallelism of both axle housing flange sides as well as a good precision on axis position alignment between the transmission shafts from first to the second side needs to be maintained, which is difficult to machine as well. Where it is difficult to manufacture the tolerance of the axle housing thickness; shimming of bearings is required. For the stack, housing dimensions measurements and classification has to be included. Plus, precise axis alignment is required at various points along the cross shaft, even at the subcomponent level of the cross shaft. In this arrangement transmission bearing and/or shaft loads are supported within the eMotor side housing. To the contrary, eAxles disclosed herein solve that axle housing machining issue by providing a carrier assembly that comprises a carrier assembly that is a structure which includes the eMotor side transmission and shifting assembly portion and forms a transmission cartridge that is insertable together into the axle housing. That cartridge assembly includes all the precise machining for the transmission bearings, shafts, and gears as well as the shifting assembly parts.

Advantageously, using principles of the present disclosure, the axle housing needs no precise machining related to the transmission assembly. Only precise machining for internal cartridge parts is needed for the resulting stack up of shifting assembly, which is easier to manufacture when compared to existing eAxles. The cartridge assembly includes a cartridge pilot diameter for direct positioning and/or alignment into the axle housing and/or the eMotor itself. In this way, all transmission bearing and/or shaft loads are carried in the carriage assembly as closed loop supported by the cartridge housing.

In examples, the carriage assembly includes an overall transmission portion (e.g., a 3-speed transmission including an eMotor side reduction stage as well as a differential assembly that includes an axle central differential with crown and pinion set). This allows the carriage assembly to be directly assembled into the axle housing structure. In examples, the carriage assembly can support all the transmission bearing and/or shaft loads as a closed loop in this carriage assembly. This can be especially true at differential bearings legs that are connected together with the carriage, allowing negligible loads and/or support within the axle housing. In examples, the carriage assembly includes a pilot diameter for direct positioning and/or alignment into the axle housing and/or to align the axis of the eMotor itself properly to an input shaft of the transmission.

Figure 11:
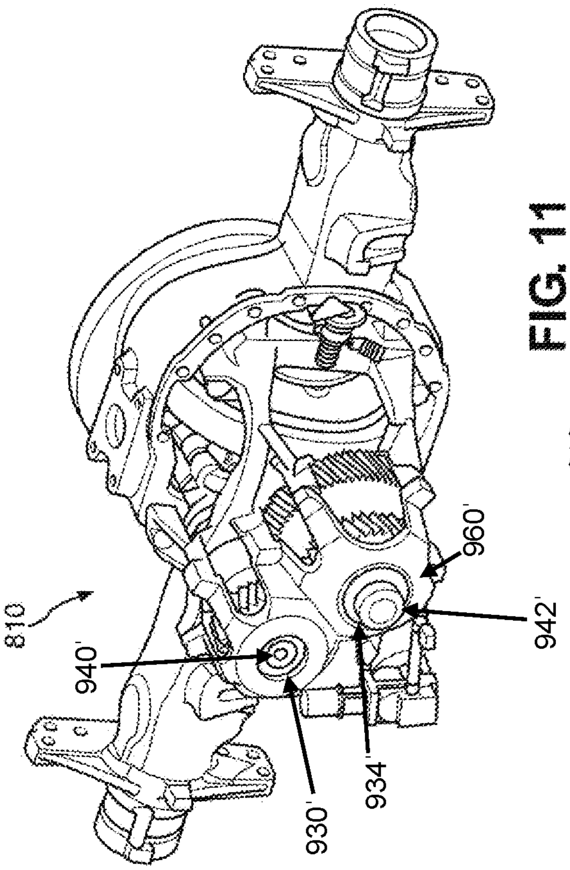
FIGS. 10-12 show sequential stages of assembling an axle assembly with a spider structure.
Figure 10:
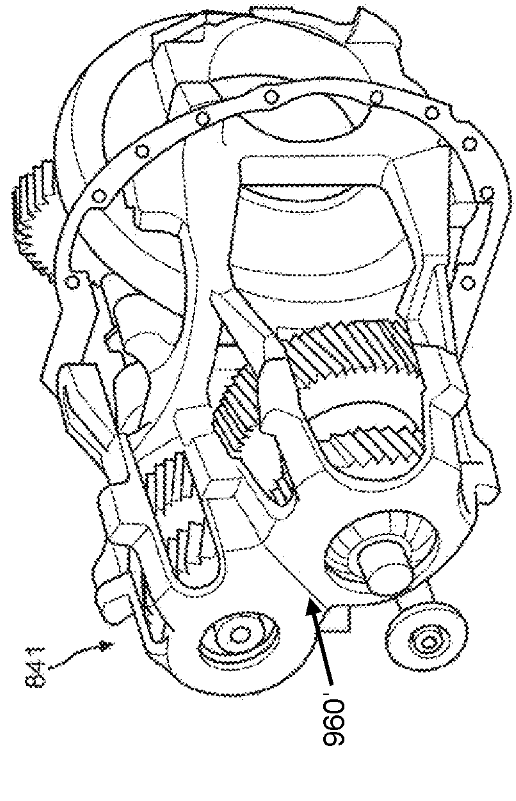
Figure 14:
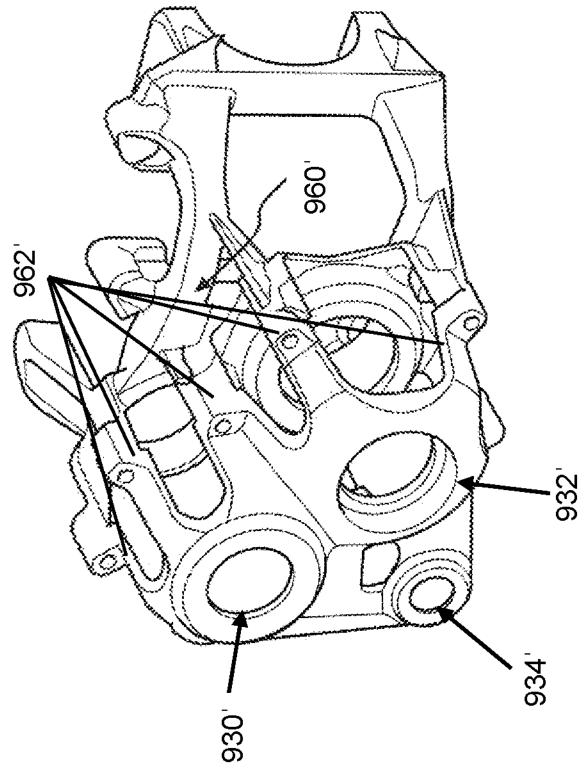
FIG. 14 is an isolated view of a spider structure.

In examples, the carriage includes a spider assembly, which may also be referred to as a spider structure 960' and a separate cover 866. In this example, the spider structure 960' carries the main transmission portion contents and the shaft bearing supports for the crown and pinion gear set (which requires a quite robust and stiff housing structure, preferably made in spheroidal cast iron material for strength). As is best shown in FIG. 14, the spider structure 960' includes first, second, and third holes 930', 932', 934'. As is best shown in FIGS. 10 and 11, the first and second holes 930', 932' may receive first and second shafts 940', 942', respectively. In addition or in alternative to this example, the spider structure 960' has legs 962', which are best shown in FIG. 14, that extend to the bearing supports and close the entire transmission side with as simple lightweight (e.g., aluminum, reinforced plastic, etc.) cover to make an oiltight seal against the axle housing 840. An advantage of this spider structure 960' can be that this implementation of the carriage assembly saves on the total weight as well as creates a possibility for designing the cover with an ornamental appearance for branding, as an example. In general, this implementation of the carriage assembly is designed as a spider structure 960' designed to minimize overall structure (and thus weight) to include essentials to the load supporting function of the internal gears and shaft bearing loads of the transmission while providing a closed oiltight seal with a simple non-structural cover. In addition, this non-structural cover can be designed by using lightweight materials, such as aluminum, reinforced plastic, etc., to reduce the overall carriage assembly weight.

Next, highlighting the split transmission assembly in further detail, the present disclosure provides a front/rear split transmission architecture (or assembly) with split gear and clutching arrangement. In examples, this transmission assembly provides a selectable single/double reduction eMotor stage (e.g., forming a split group) that works together or cooperates with two gear sets (e.g., plains, trains, or stages) on the transmission to build together a 3-speed transmission. The multistage reduction gear set is designed with additional gear set when compared to typical eAxle designs so as to provide a selectable single/double reduction eMotor stage, which is designed to cooperate with multiple (e.g., two or more) gear sets on the transmission to build together at least a 3-speed transmission. Even so, this implementation utilizes less (e.g., just 9) helical gears than in existing designs (e.g., which require 10 helical gears). Further as there can be just 2 gear sets packaged on the transmission side of this eAxle, such implementations reduce an overall standout at the transmission side as well as allowing a more compact width to (e.g., to ensure clearance to air bellows and/or other components of a connected suspension or vehicle).

Continuing with the split transmission having a split group on eMotor side and two stages on the transmission side, principles of the present disclosure include several distinguishing features. For instance, the split group (with a selectable single/double reduction on the eMotor side) is combined with the 2 other selectable gear stages, which together build a 3-speed transmission. In examples, this is a 4-speed transmission, but the 4th gear is not a desirable ratio to be utilized. In addition, or in alternative, the first portion within the eMotor side is connected with through shaft(s) to the second portion on the transmission side to enable a compact design and/or standout on both sides. In addition, or in alternative, the shifting assembly (e.g., clutches or clutch elements) of the eMotor side reduction can be located either on the eMotor side or the transmission side. In addition, or in alternative, only single clutch movement is needed between each adjacent gear range.

Regarding the advanced lubrication tube, bearings on the main shaft and output shaft eMotor side can be provided with oil from an oil pump to ensure that each receives enough oil. In examples, oil can be brought to distinct lubrication points over a long distance and turning parts. Typical lubrication tubes use one tube, but this design is limited because there are many consumer positions (orifice holes) to be included. So the oil supply cannot be ensured to equally spread oil between the first holes and the most rearward holes. By contrast, lubrication tube assemblies disclosed herein include two separate pipes (or conduits) design to enable each pipe to supply enough oil into each lubrication point. Lubrication tube assemblies disclosed herein include eMotor-side housing lubrication points (e.g., bearings, splines, etc.) without having a lower oil amount through longer supply length of existing lubrication tubes. At the transmission side (e.g., the carriage assembly side) of the lubrication tube assembly, there are also lubrication points (e.g., bearings, splines, etc.) without a larger oil amount through shorter supply length of oil pipe as existing designs.

Notably, lubrication tube assemblies disclosed herein provide a conduit (e.g., a pipe, tube, etc.) inside the other one, so that a supplied amount of oil is similar to all lubrication points. In additional, or in alternative, such lubrication tube assemblies can supply only from one pressure channel, which is in fluid communication with an oil pump, and helps both pipes get the same amount of oil. As discussed herein, this design can be a nested conduit and/or pipe-over-pipe design with lubrication perforations corresponding to the eMotor-side lubrication points and transmission side lubrication points. Such an arrangement of the two conduits (e.g., split and/or one inside and one outside)

with only one feeder position can ensure a proper lubrication on all lubrication points with similar amount of oil distribution into both pipes.

Now turning to the figures, FIG. 1 shows an example of a multi-mode hybrid vehicle system 200 as disclosed herein. The system 200 includes a chassis 118 and a plurality of motive power sources. For example, an integrated axle 202 is mechanically coupled with a steerable front axle 102A such that the integrated axle 202 is used as a motive power source to provide the motive force to drive the front wheels 120A using electrical energy provided form the energy storage 110. The rear axle 102B is mechanically coupled with the differential gears 116, which is mechanically coupled with the transmission 114, which is mechanically coupled with or decoupled from the engine 104 via the clutch 112. The rear axle 102B, therefore, is controlled using the motive force provided by the engine 104, another power motive source. For simplicity, the inverter(s) for the integrated axle 202 and the fuel reservoir coupled with the engine 104 are not shown.

As disclosed herein, an "integrated axle" includes a type of electric axle drive that is affixed to the wheels to rotate them. In examples, the integrated axle combines the functionality of an electric motor-generator, power electronics such as an inverter, and in some examples a cooling circuit to reduce cost and increase efficiency in a single component. Integrated axles are neither directly nor indirectly coupled with any combustion engine, thereby using solely the motor-generator included therein to provide mechanical power to a drive axle coupled thereto.

In some examples, the motor-generator of the integrated axle may be mounted on the drive axle. In some embodiments, the integrated axle is configured to reduce interfaces and components that may induce efficiency loss. Examples of such components include wires and copper cables that link the components together, plugs, bearings for rotating components, and separate cooling circuits for the electric motor and power electronics. The integrated axles are also more compact than the electric motor, the power electronics, and the cooling circuits therefor being individually installed, thus saving installation space within the chassis frames of the vehicle and allowing more room therein. Each integrated axle is configured independently of other integrated axle(s) in the system. In some examples, the integrated axle may also include a two-speed or three-speed gearbox.

Figure 2:
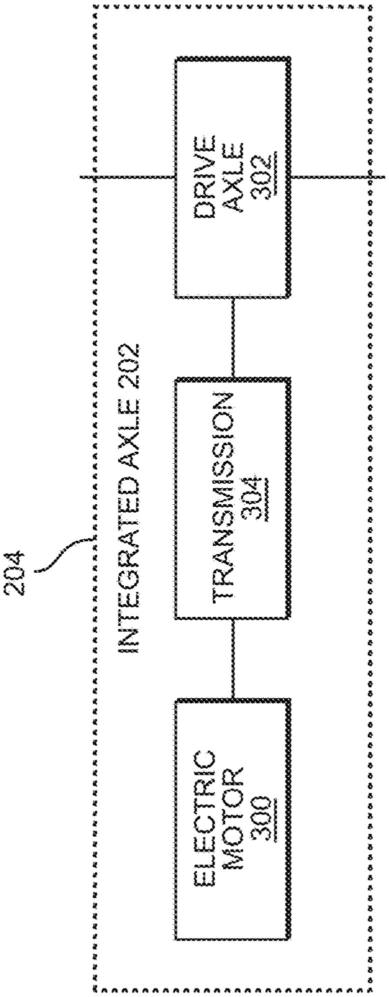
FIG. 2 is a schematic diagram of an integrated axle.

As shown in the embodiment of FIG. 1, the integrated axle 202 is mechanically coupled with a drive axle, such as the front axle 102A as shown in FIG. 1. The drive axle 102 is mechanically coupled with a pair of wheels, such as the pair of front wheels 120A as shown in FIG. 1. Although not shown, a controller is electrically coupled with the integrated axle 202. Based on the inputs received, the controller turns on (activates or engages) or turns off (deactivates or disengages) one or more of these components to achieve the different modes shown herein. FIG. 2 shows some of the components of the integrated axle 202. For example, the integrated axle 202 includes an electric motor-generator 300, a drive axle 302, and a transmission 304. Other components such as the aforementioned inverter and/or cooling circuit may be included in the integrated axle 202, as suitable. These components are separately or independently operable from the other components (e.g., the transmission 304 is separately operable from the transmission 114). The components of the integrated axle 202 (e.g., the electric motor-generator and at least a portion of the drive axle, etc.) may be mechanically mated to, coupled to, affixed to, or implemented within a common housing 204. The housing may be any suitable structure which supports the positioning of the components, as well as to provide protection of the components.

Figure 3:
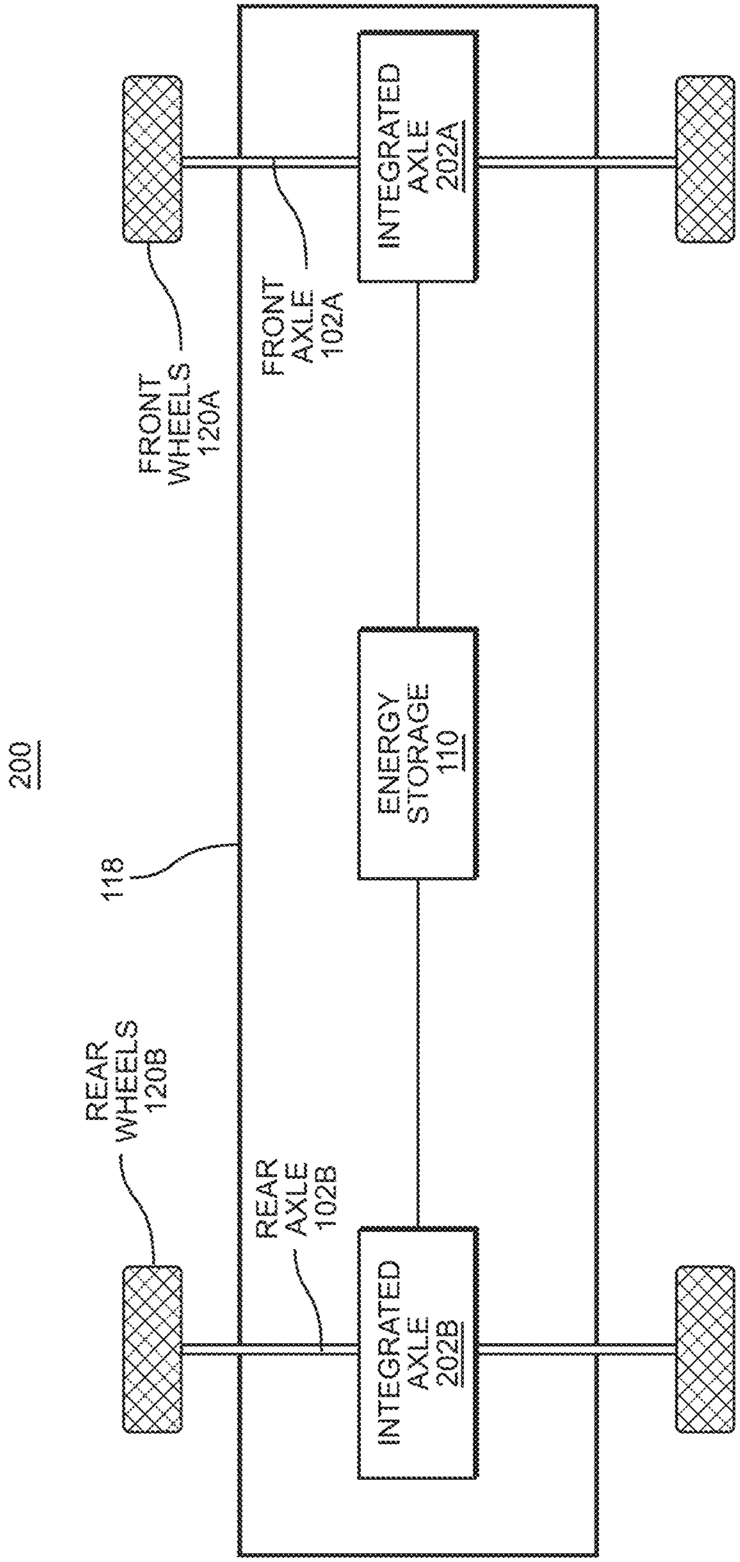
FIG. 3 is a schematic diagram of another dual-axle multi-mode adjustable hybrid vehicle system with integrated front axle.

FIG. 3 shows an example of the system 200 which incorporates two integrated axles 202A and 202B, with one implemented for each of the front axle 102A and the rear axle 102B, respectively. The integrated axles 202A and 202B are operated using the controller (not shown) and the electrical energy for these axles are provided by a common energy storage 110, such as a battery or a battery pack. The two integrated axles 202A and 202B may be separately and independently operated so as to be implementable as two separate and distinct motive power sources. Each integrated axle may include the same components, including for example an electric motor and a transmission as explained herein, that are separately operable from each other, although they may be operable together simultaneously as well, as suitably controlled by the controller.

Figure 4:
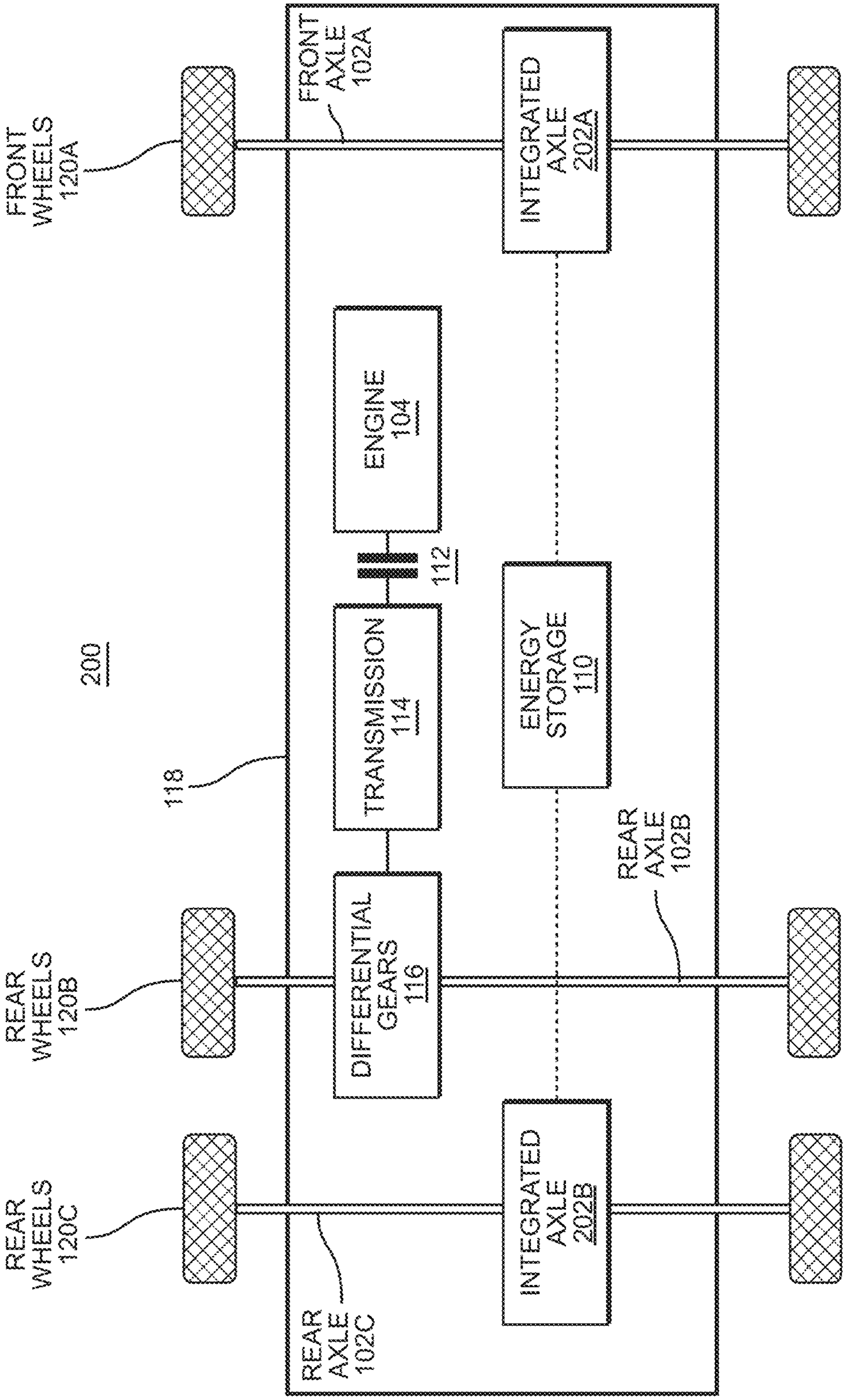
FIG. 4 is a schematic diagram of an example of a three-axle multi-mode adjustable hybrid vehicle system with integrated front axle.
Figure 5:
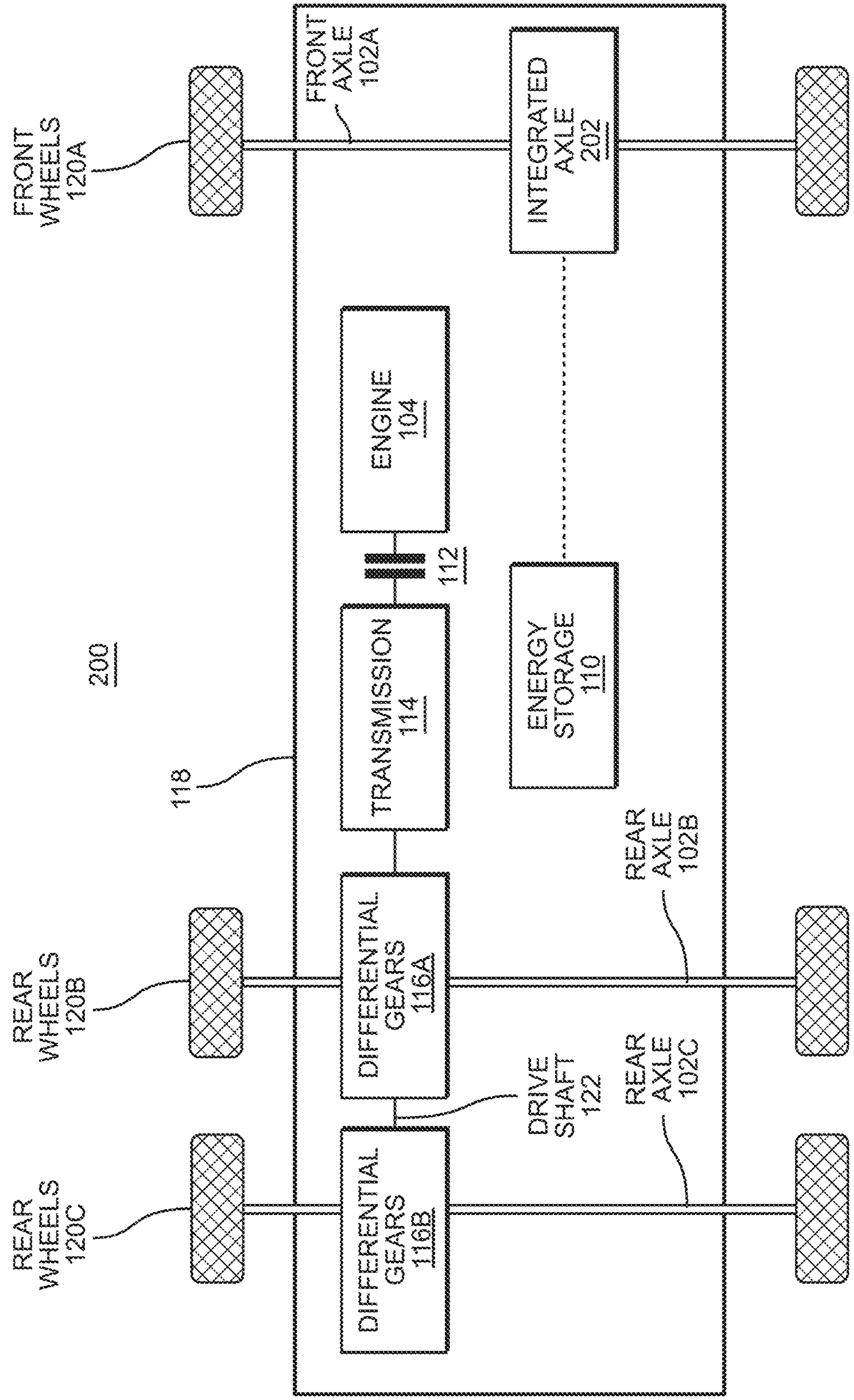
FIG. 5 is a schematic diagram of an example of a three-axle multi-mode adjustable hybrid vehicle system with integrated front axle.
Figure 6:
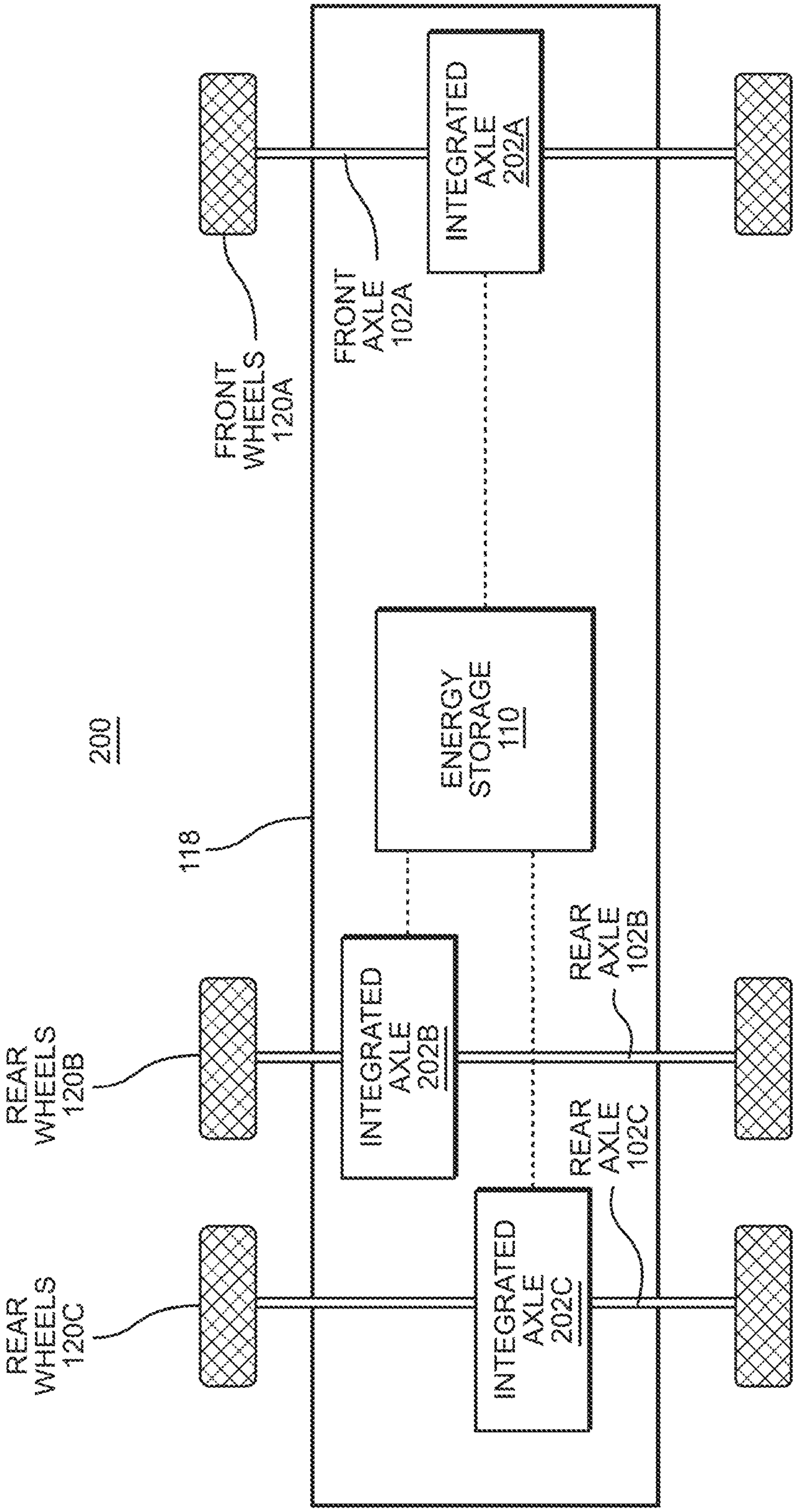
FIG. 6 is a schematic diagram of an example of a three-axle multi-mode adjustable hybrid vehicle system with integrated front axle.

FIGS. 4 through 6 show examples of the system 200 where more than two axles (and in effect, more than four wheels) are implemented, with different combinations of integrated electrical axles and engine-powered axles implemented therein. It is to be understood that these figures are provided for illustrative purposes only, such that any additional number of axles may be implemented according to the need of the vehicle and its operation.

FIG. 4 shows an example of the system 200 which incorporates three axles 102A, 102B, and 102C, of which two of them, the front axle 102A and the rear axle 102C, have integrated axles 202A and 202B, respectively, coupled therewith. Rear wheels 120B, 120C are provided with axles 102B, 102C, respectively. The other axle (rear axle) 102B is coupled with the engine 104 via the clutch 112, transmission 114, and differential gears 116 as shown. The integrated axles 202A and 202B are electrically powered by the energy storage 110.

FIG. 5 shows an example of the system 200 with three axles 102A, 102B, and 102C, but instead of two integrated axles, only the front axle 102A is coupled with the integrated axle 202, and the two remaining rear axles 102B and 102C are coupled with differential gears 116A and 116B, respectively. The differential gears 116A and 116B are coupled with each other via the driveshaft 122 which may operate both of the gears simultaneously, using the power provided by the engine 104 and transferred through the transmission 114. As such, the rear axles 102B and 102C may be coupled with each other via the driveshaft 122.

FIG. 6 shows an example of the system 200 with all three axles 102A, 102B, and 102C being powered electrically using the energy storage 110. That is, there are three integrated axles 202A, 202B, and 202C for the three axles, each independently operable, as controlled by a controller (not shown). In all examples disclosed herein, the front axle 102A is always implemented with an integrated axle, but the remaining axles may have integrated axles, engine-powered axles, or a combination of both.

Figure 7:
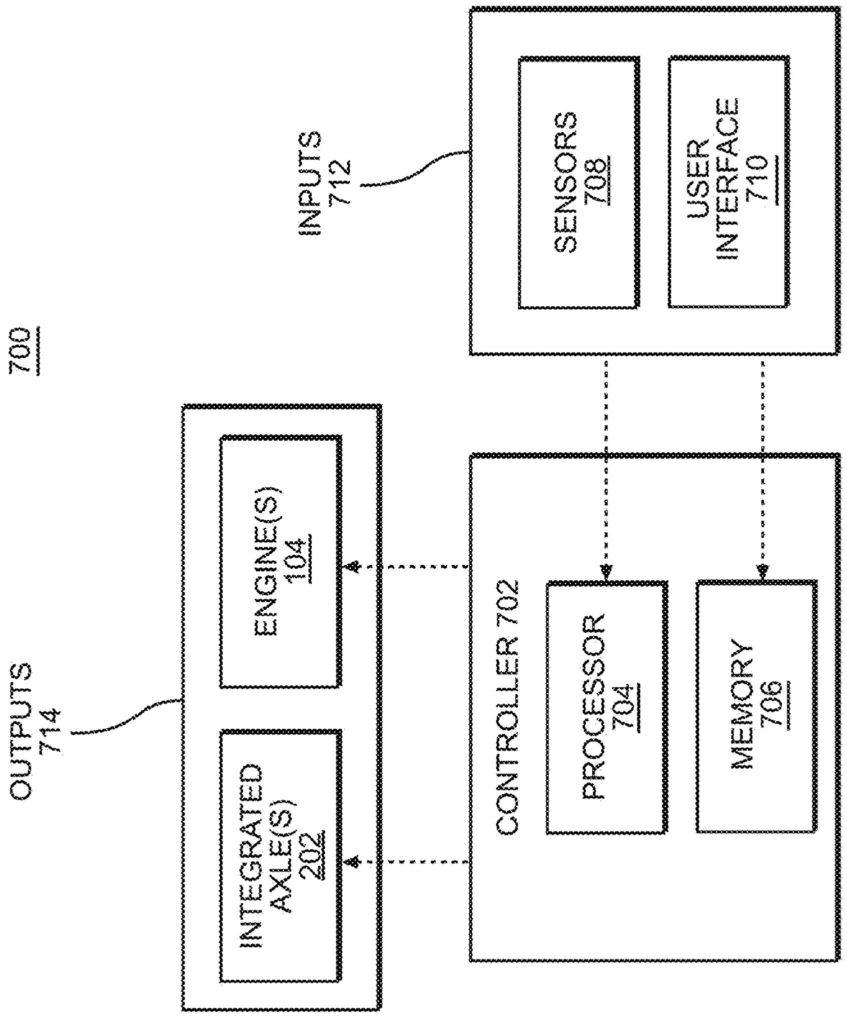
FIG. 7 is a schematic diagram of a controller operatively coupled with other components of the system.

FIG. 7 shows an example of a control system 700 for the multi-mode hybrid vehicle system 200 as disclosed herein. The control system 700 includes a controller (multi-axle system controller) 702 which receives inputs 712 and controls the outputs 714. The controller 702 includes a processor 704 and a memory unit 706. The processor may be a microprocessor, a microcontroller, or any other suitable types of processing device or controller as known in the art. The controller 702 controls the operation of the integrated axle(s) 202 and engines 104 over communication lines, for example. It should be understood, however, that communication between controller and the integrated axle(s) and engine(s) may alternatively, or in addition, be performed wirelessly.

It should be understood that, in some embodiments, the controller 702 may form a portion of a processing subsystem including one or more computing devices having non-transient computer readable storage media, processors or processing circuits, and communication hardware. The controller 702 may be a single device or a distributed device, and the functions of the controller may be performed by hardware and/or by processing instructions stored on non-transient machine-readable storage media. Example processors include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

Certain operations of the controller 702 described herein include operations to interpret and/or to determine one or more parameters. The parameters may be inputs 712 which may be information or data received from sensors 708 and/or user interface 710, among other means of providing inputs. The sensors may be any suitable sensor that can measure any change or increase in the load of the vehicle or the load applied on the vehicle. The sensors may include, but are not limited to, weight sensors which detect the physical weight of the vehicle and/or its cargo, gyroscopes which detect the incline or decline in which the vehicle may be traveling, and altimeters which detect the altitude or change in altitude as the vehicle travels, among others.

Interpreting or determining, as utilized herein, includes receiving sensor values by any method known in the art, including at least receiving values over communication lines, from a datalink, network communication or input device, receiving an electronic signal (e.g. a voltage, frequency, current, or pulse-width-modulation signal) indicative of the value, such as the current and expected loads of a vehicle as well as user's preference or whether the rear axles are approaching or reaching their performance limit, for example, as further explained herein, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

The above-described embodiments of the technology described herein can be implemented in any of numerous ways. For example, the embodiments may be implemented using hardware, software or a combination thereof. When implemented in software, the software code (or software algorithm) can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone or any other suitable portable or fixed electronic device.

Also, a computing device may have one or more input and output devices. These devices can be used, among other things, to present the user interface 710 (which may be an output device as well as an input device). Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing devices may be interconnected by one or more networks in any suitable form, including as a local area network, a controller area network, or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of the disclosure, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

FIGS. 8-15 show various detailed views of components in an axle assembly. The axle assembly shown is an eAxle system that combine power electronics, electric motor, and transmission all in a compact system housing. As generally shown here, the axle assembly has an axle housing, a carrier cover mounted to the axle housing, a differential assembly mounted to a carrier and received in the axle housing so as to receive at least one axle, an electric motor for transmitting torque to the differential assembly via a driveshaft that drives a drive pinion and engages the differential assembly, a gear reduction that facilitates torque transfer between the driveshaft and the drive pinion, and a transmission that operates the drive pinion at engine speed and/or some amplification thereof, according to principles of the present disclosure. It is worth reiterating that these are just some examples of the many examples disclosure herein and as such the illustrated embodiment should be construed as limiting.

In the context of this disclosure, references to directionality (e.g., longitudinal, lateral, and vertical) are made in accordance with a standardized three-dimensional vehicle coordinate system. This coordinate system is commonly used in the automotive field to define the spatial orientation of a vehicle or its components relative to the vehicle itself. It is a right-handed system, with the X-axis typically extending forward along the vehicle's longitudinal centerline, the Y-axis extending laterally to the left side of the vehicle, and the Z-axis pointing upward, perpendicular to both the X- and Y-axes. The origin of the coordinate system is generally fixed relative to the vehicle structure, often located at the vehicle's center of gravity or rear axle, serving as a consistent reference point for modeling dynamics, sensor integration, and component placement. Throughout this disclosure, the structures of an electrified axle assembly, such as the electronic axle (e-axle), are described in relation to this vehicle-based coordinate system. For example, with reference to FIG. 8, the longitudinal direction corresponds to the top-to-bottom orientation on the page, the lateral direction corresponds to movement into and out of the page, and the vertical direction corresponds to the right-to-left direction. While FIG. 8 is used as a representative example, this spatial convention applies throughout the disclosure and should be understood to consistently represent how components relate to the vehicle coordinate system, regardless of whether a particular figure explicitly references these axes.

Figure 8:
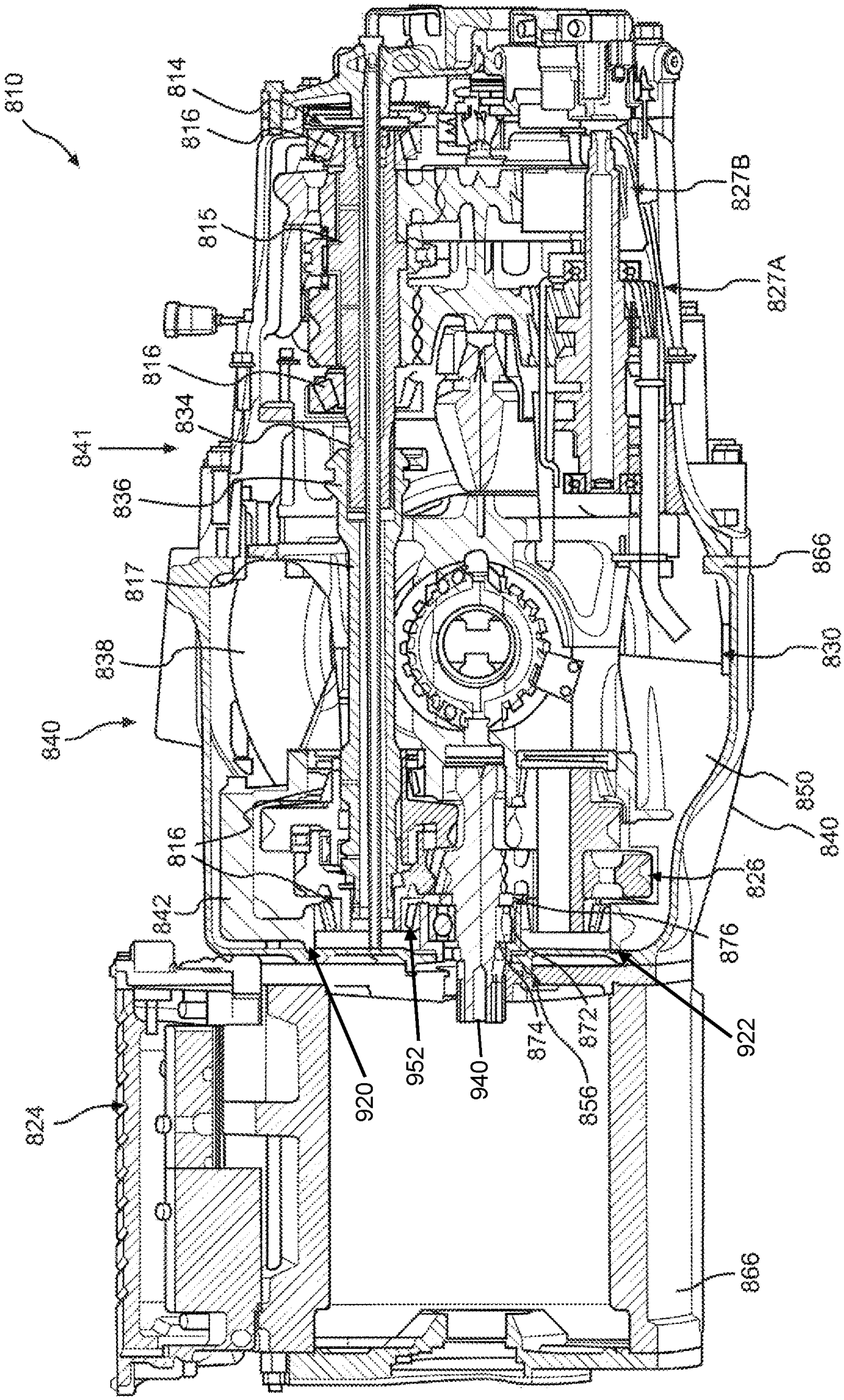
FIG. 8 is a side elevation, partial cutaway view of an axle assembly, according to principles of the present disclosure.
Figure 9:
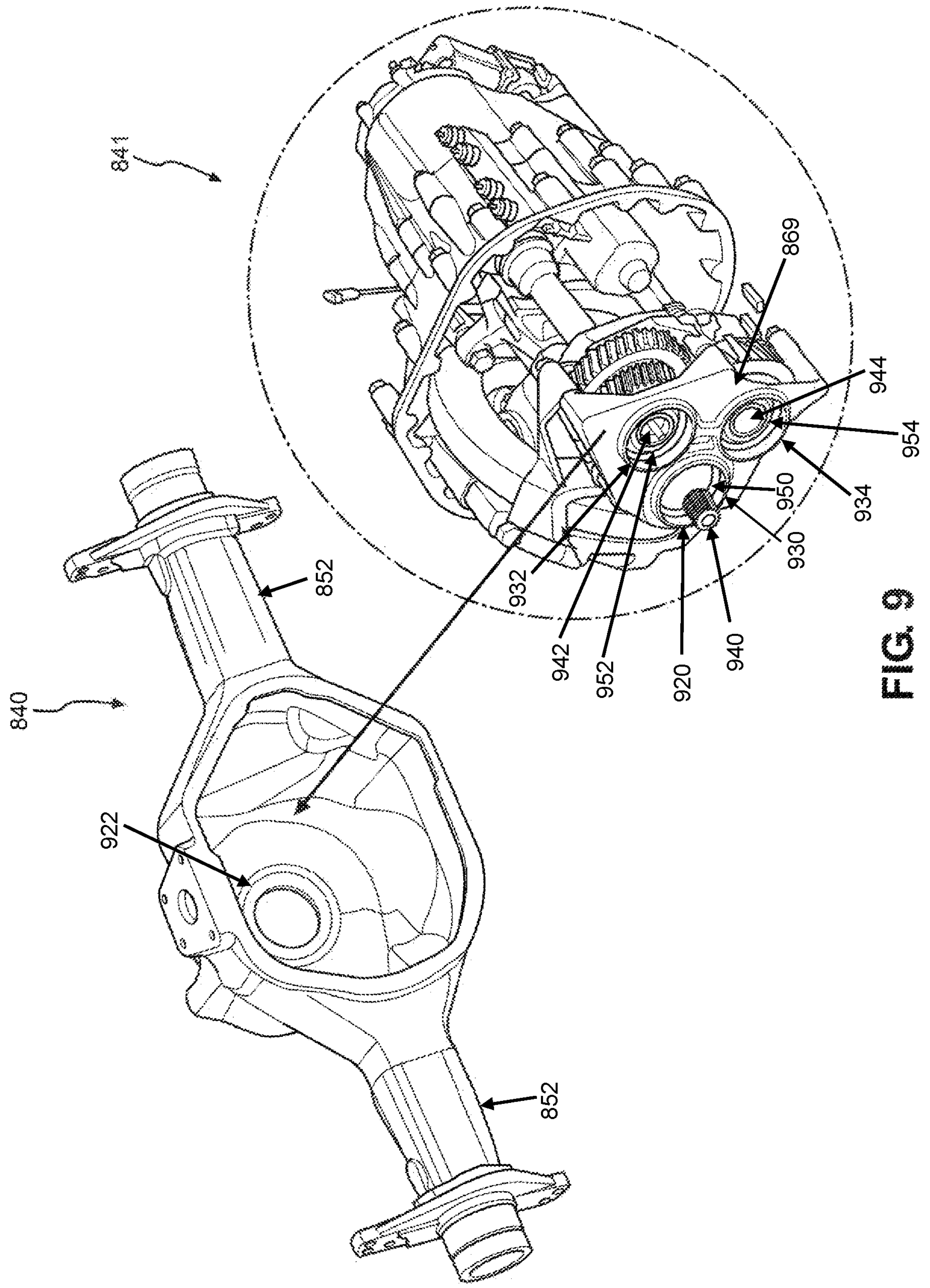
FIG. 9 is an exploded view of the axle assembly in FIG. 8.
Figure 12:
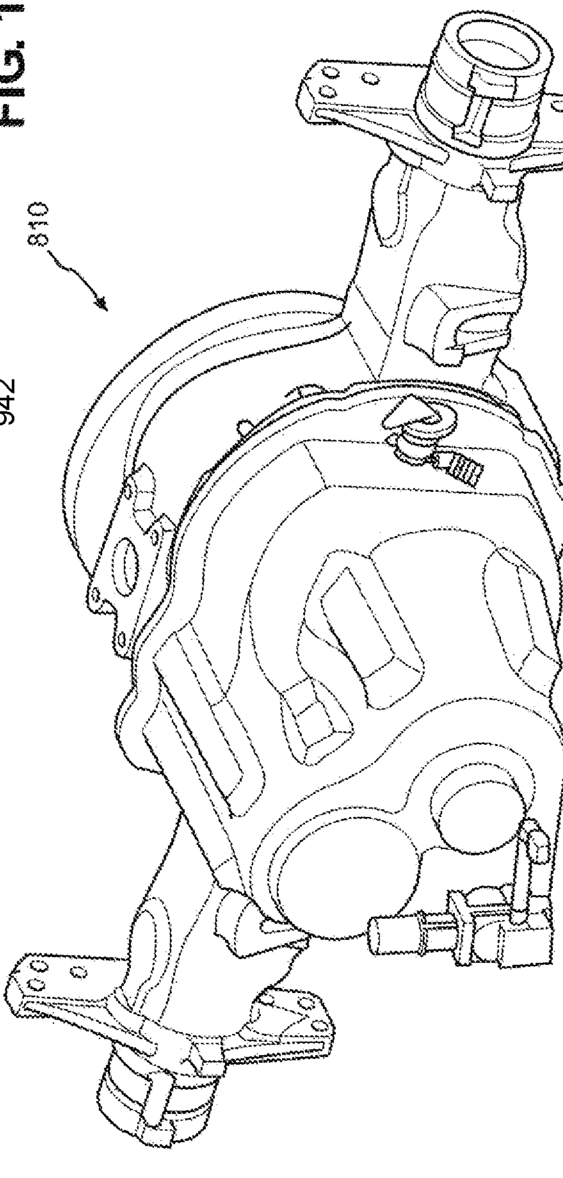
Figure 13:
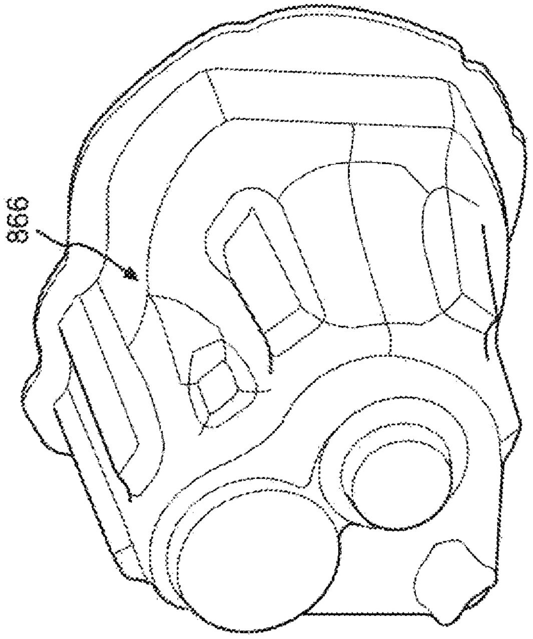
FIG. 13 is an isolated view of a covering for the axle assembly.
Figure 15:
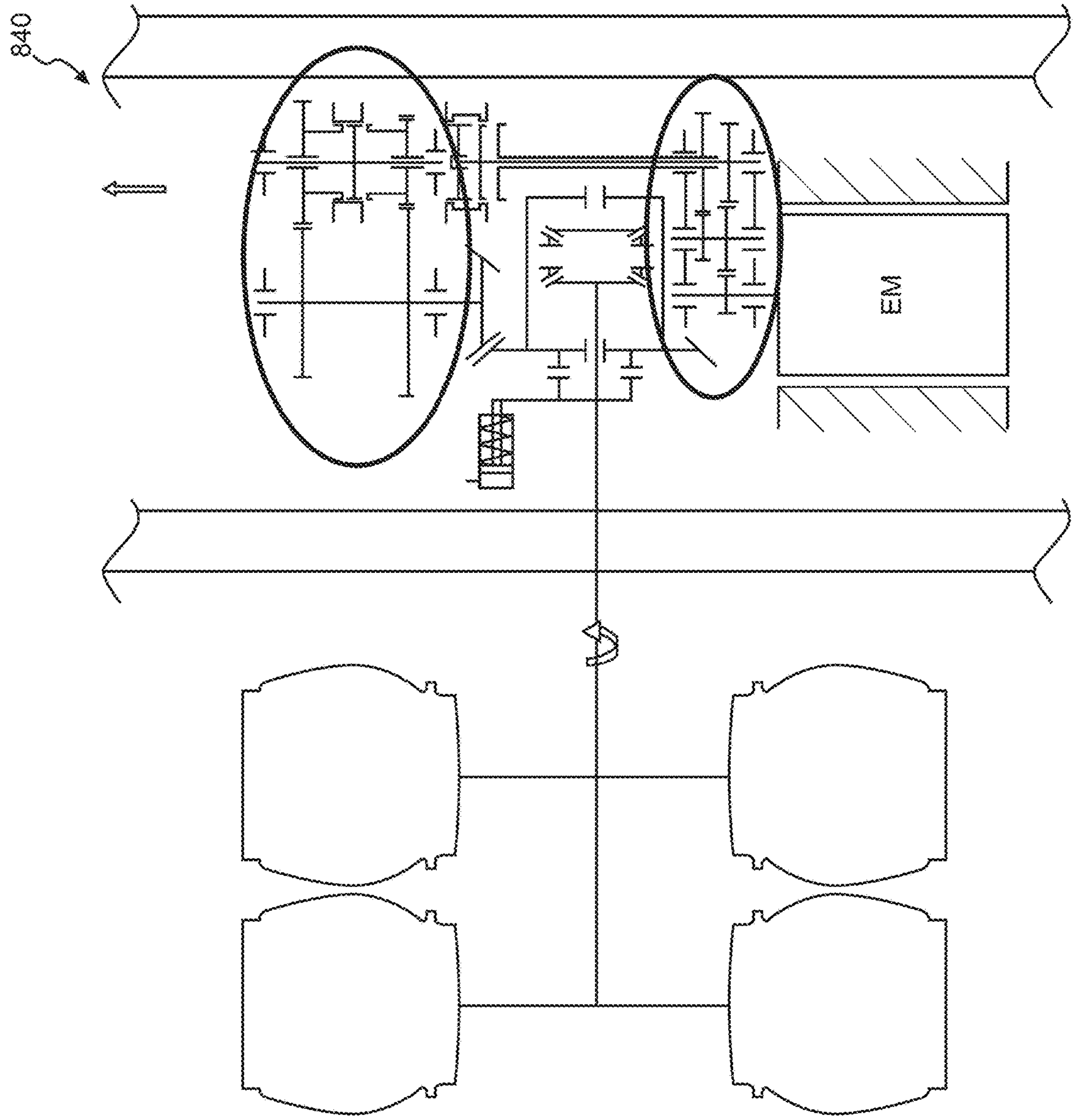
FIGS. 15-18 are diagrammatic views of flow through an axle assembly at various positions shown in the clutch table.
Figure 16:
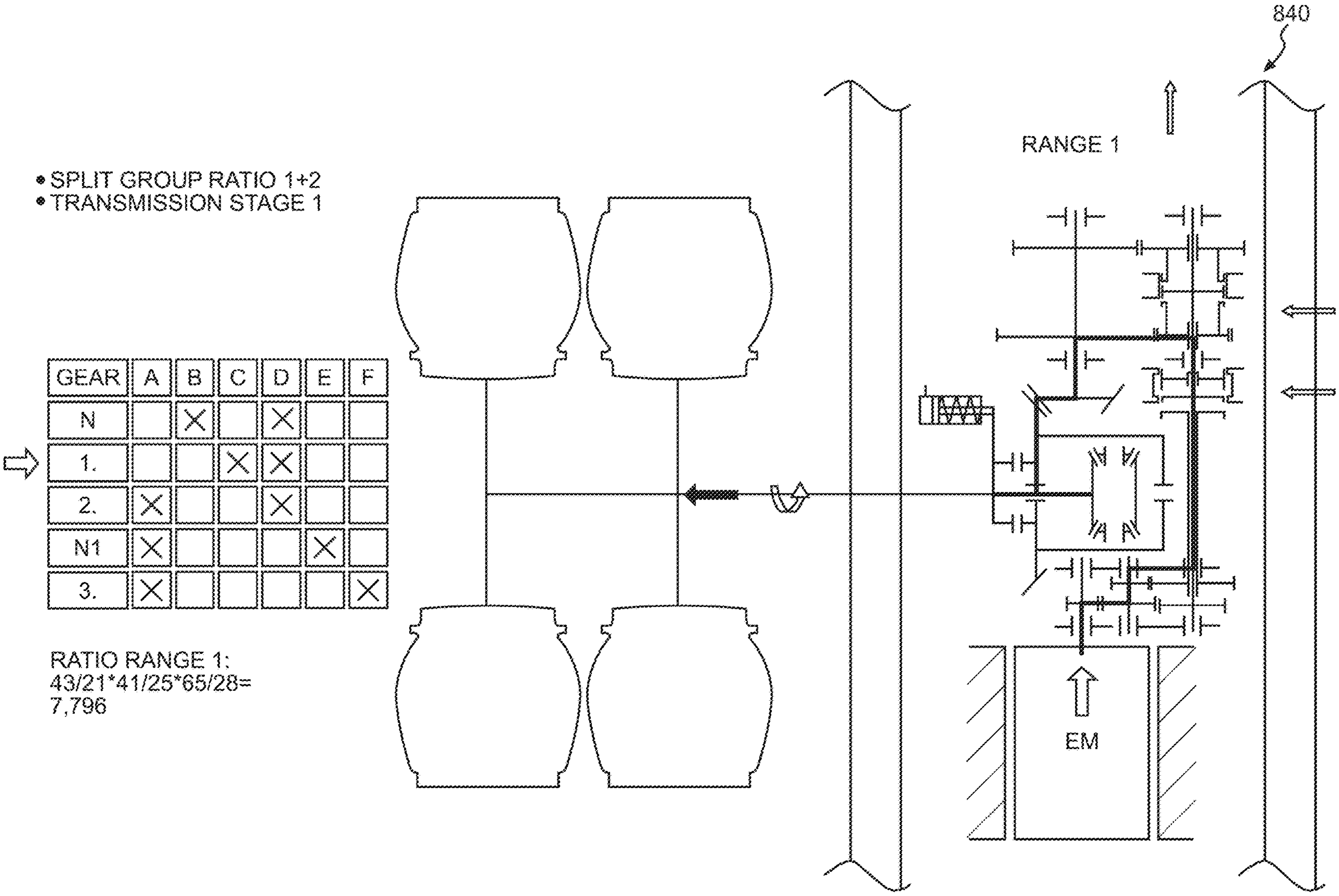
Figure 17:
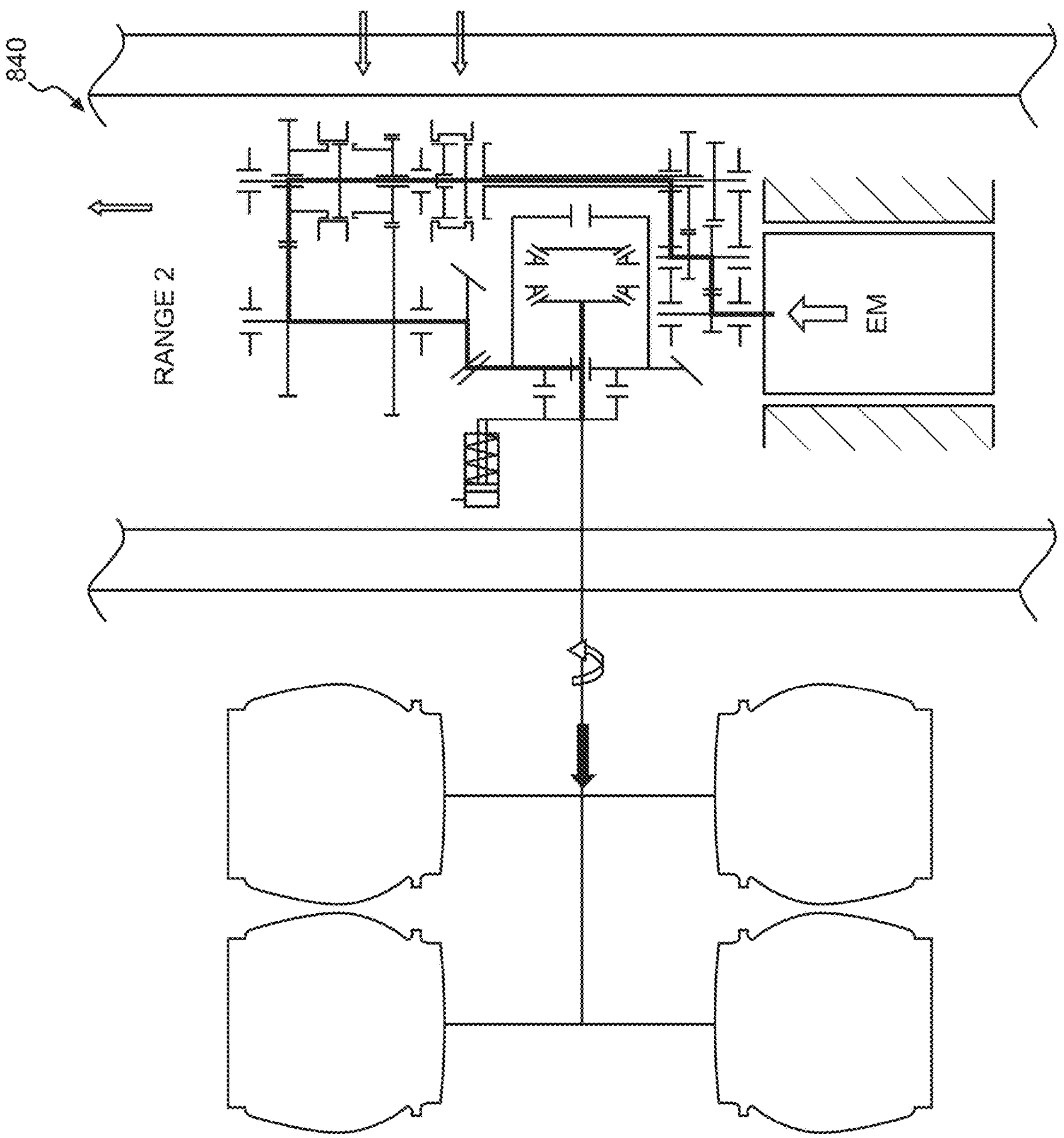
Figure 18:
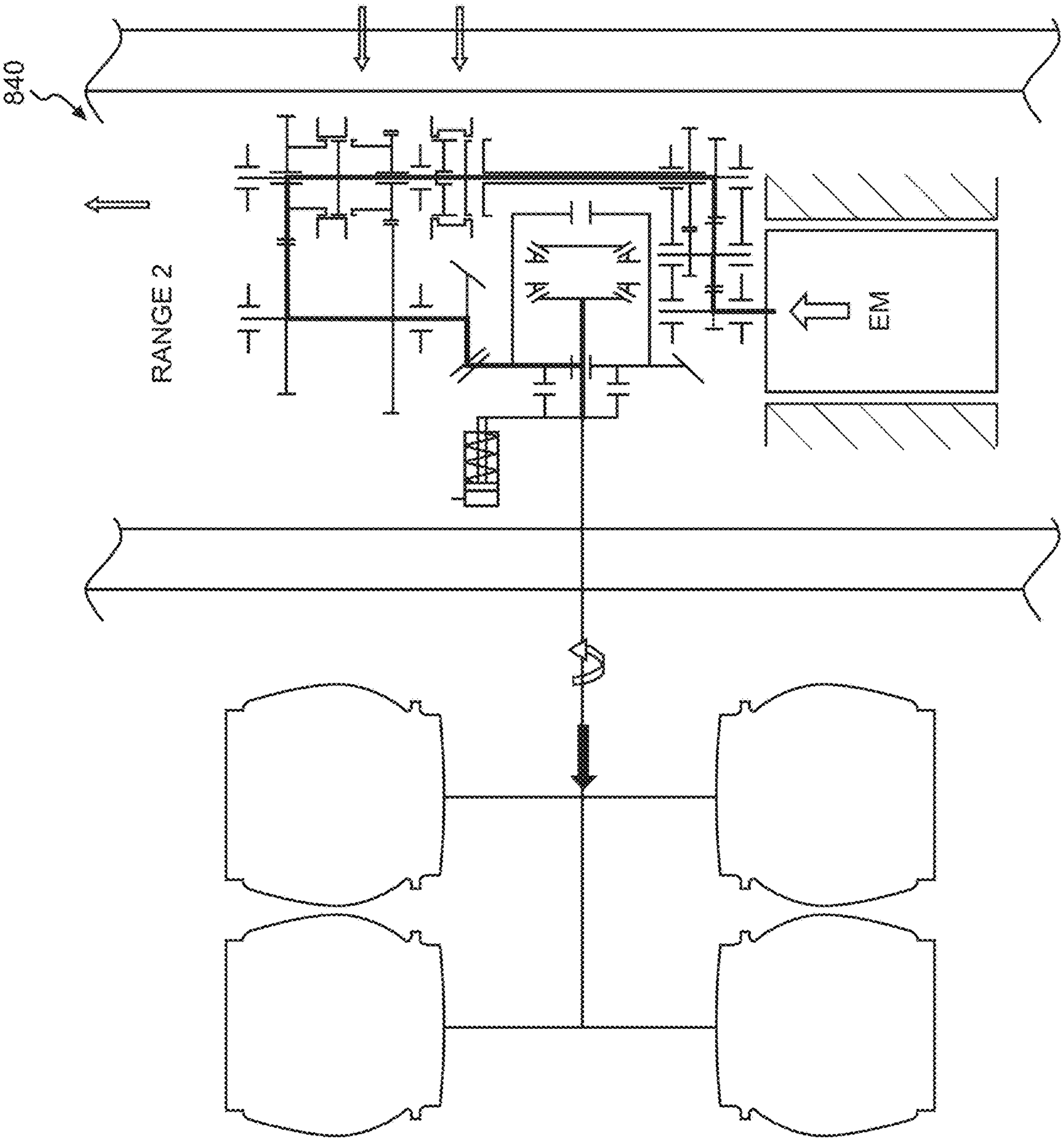
Figure 20:
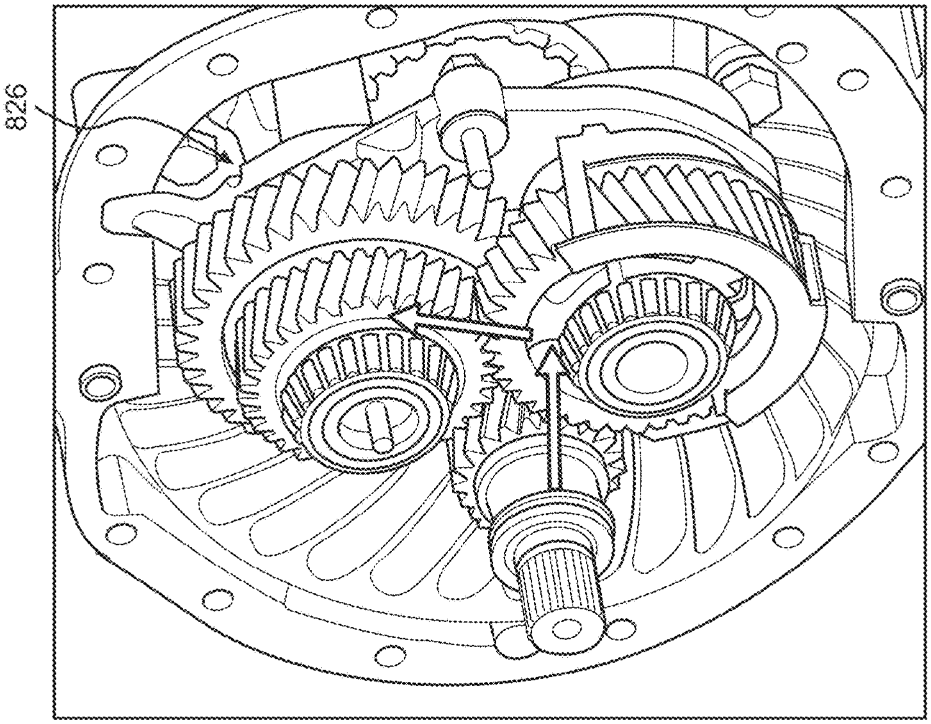
FIG. 20 is a perspective view of flow through a multistage reduction gear set in a second reduction stage.
Figure 19:
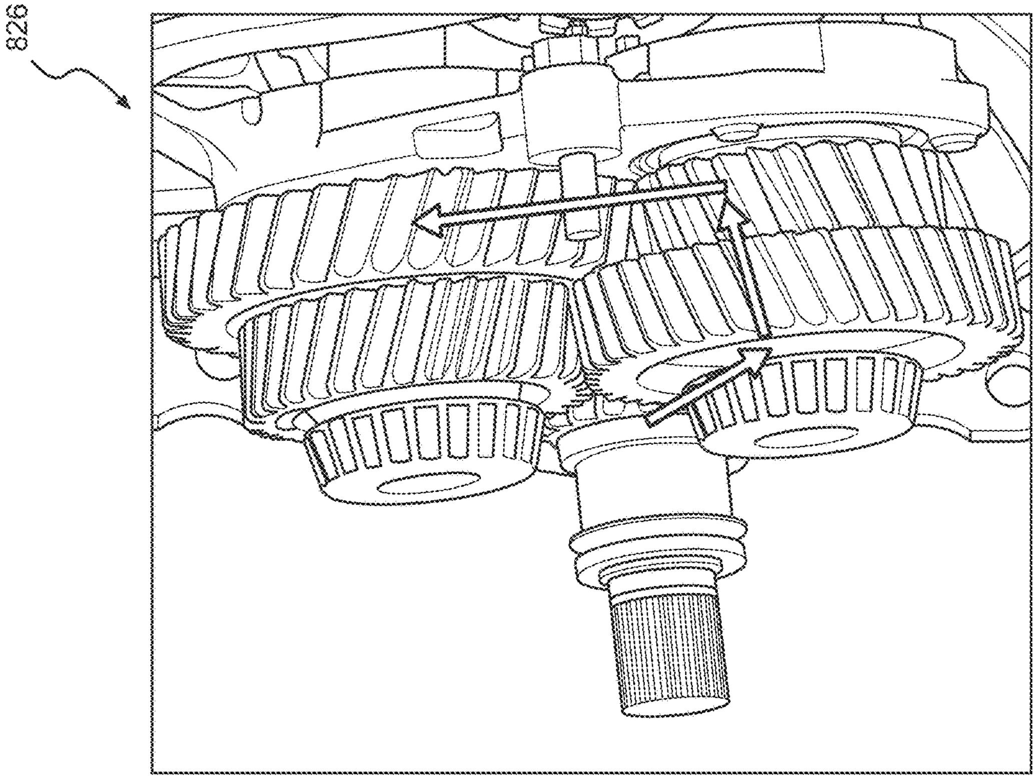
FIG. 19 is a perspective view of flow through a multistage reduction gear set in a first reduction stage.
Figure 22:
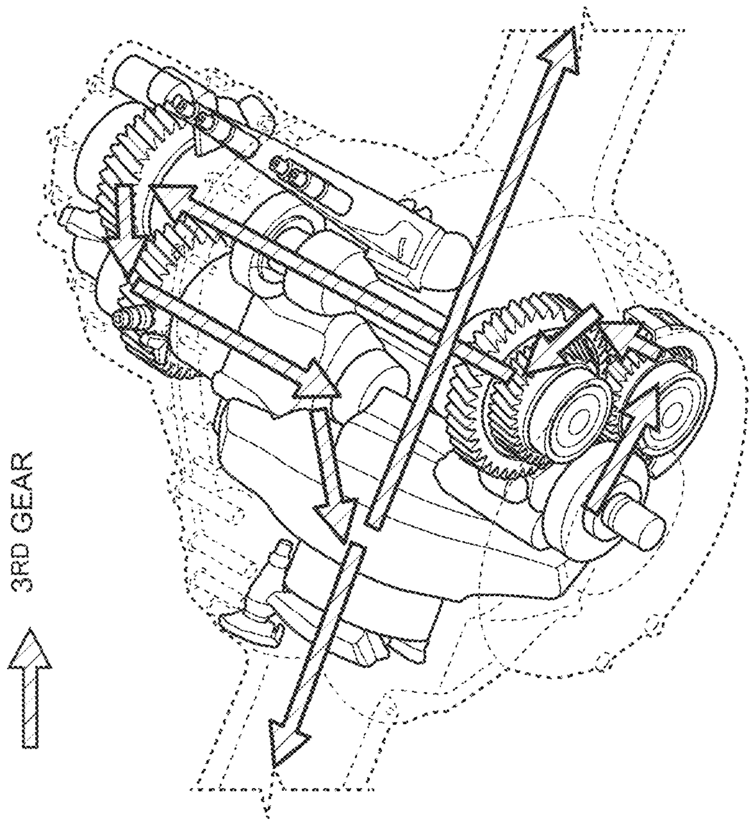
FIG. 22 is a flow diagram of the axle assembly in third gear.
Figure 21:
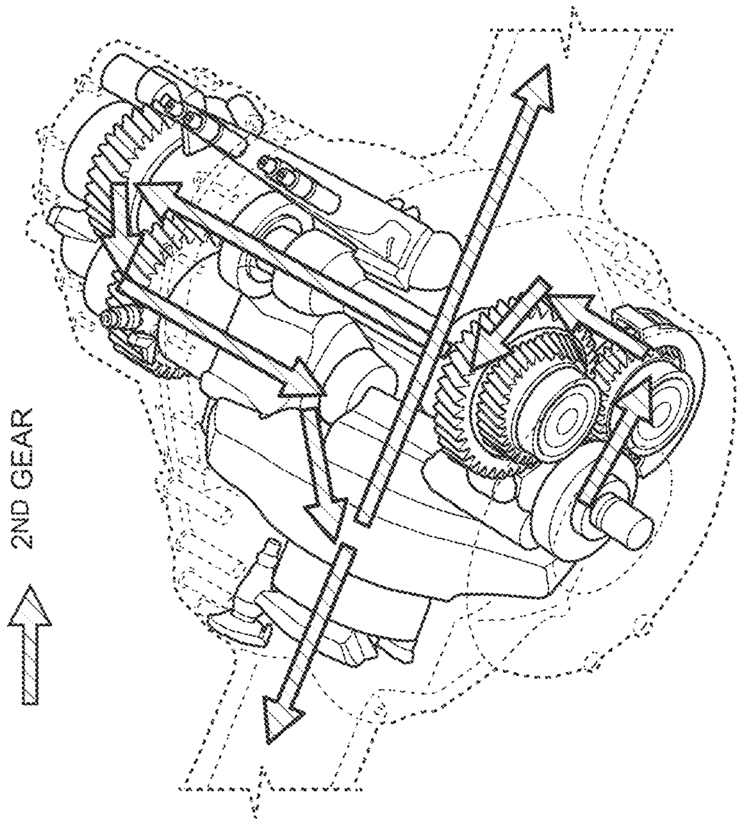
FIG. 21 is a flow diagram of the axle assembly in second gear.
Figure 23:
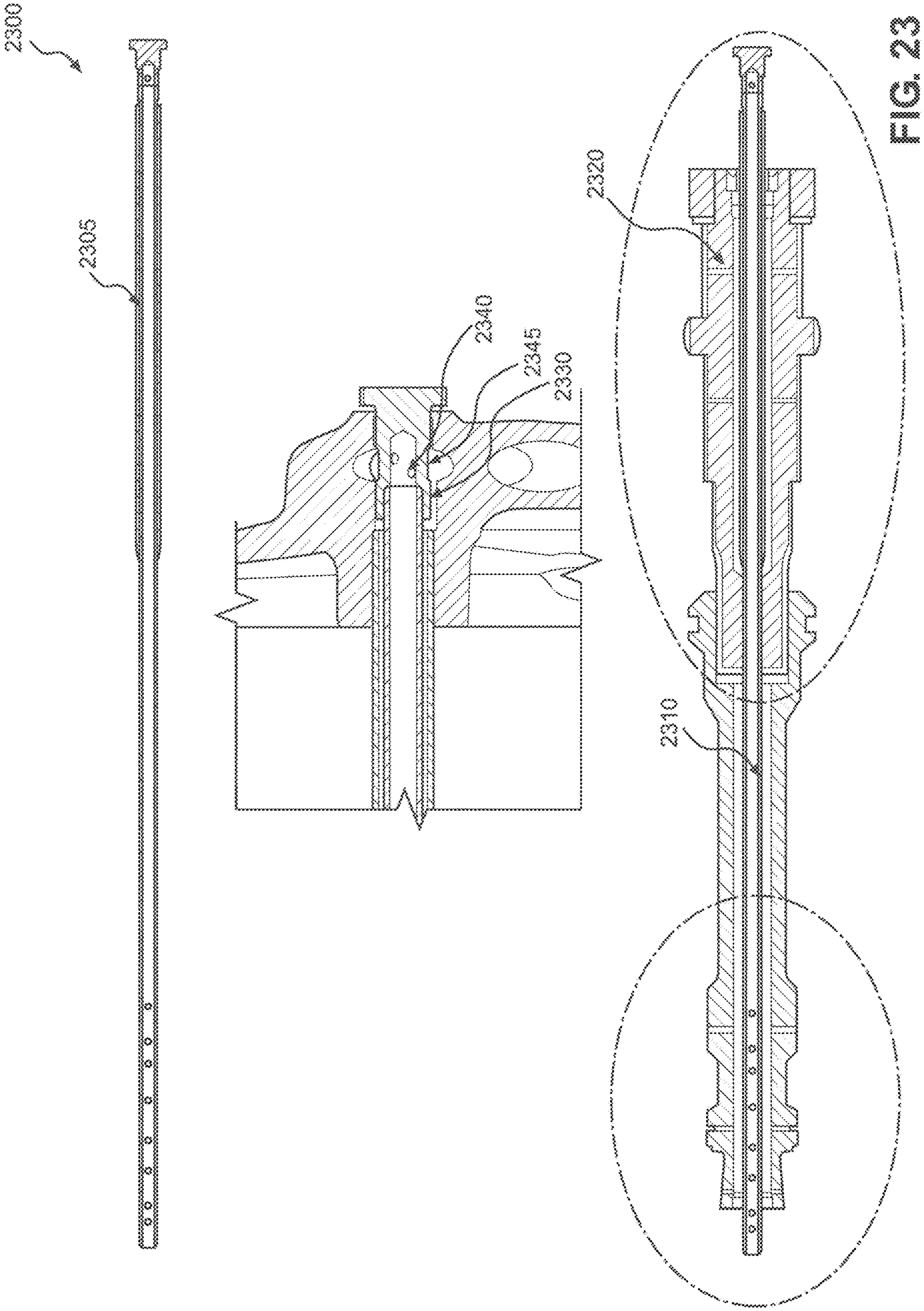
FIGS. 23 and 24 show various features of the lubrication tube assembly.
Figure 24:
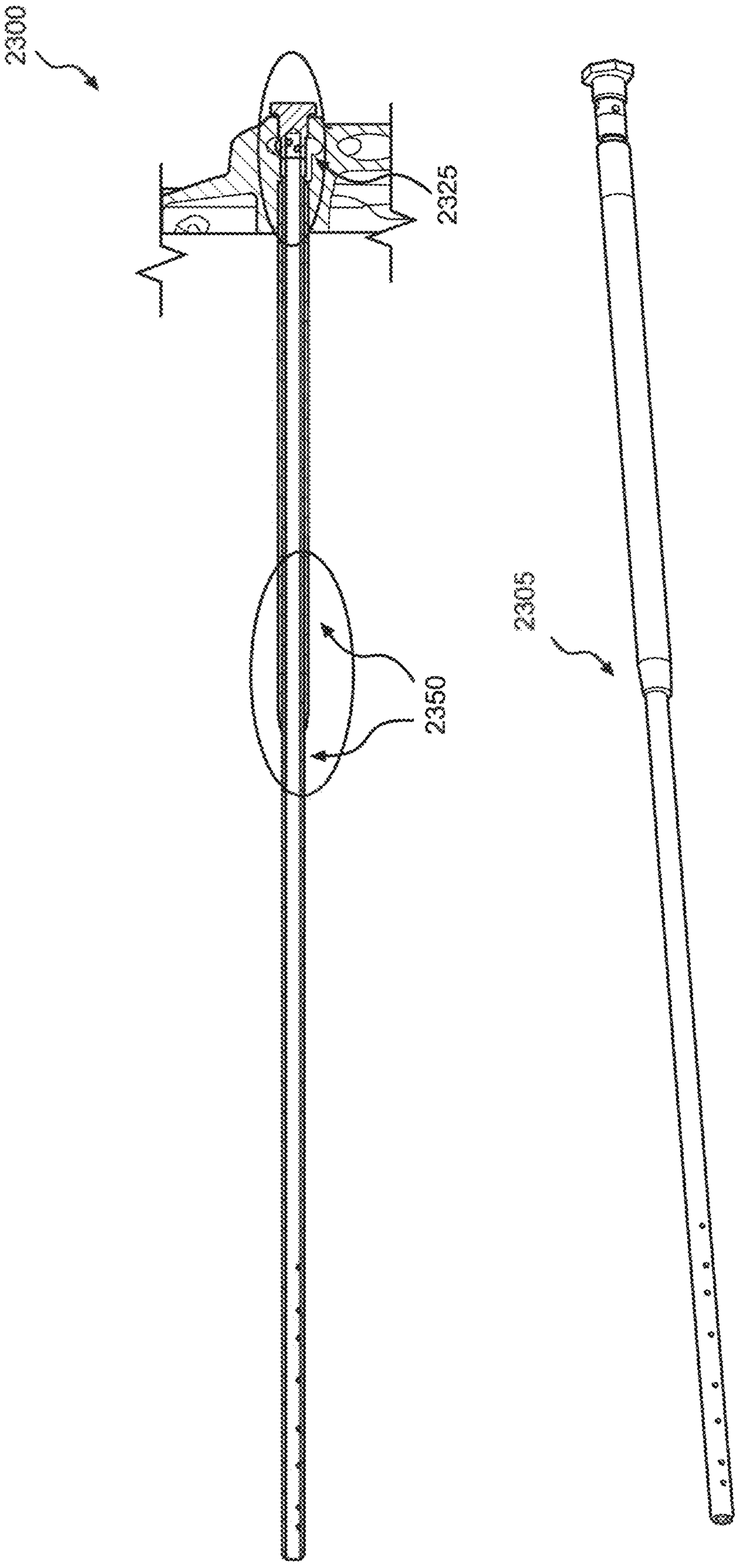
Figure 26:
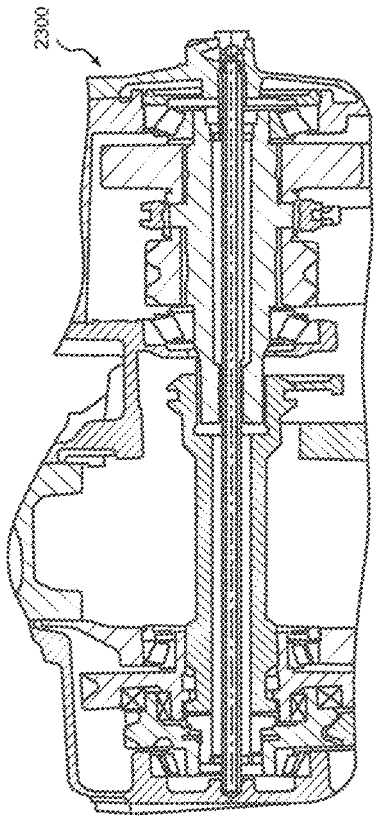
FIGS. 25 and 26 are sectional views of a lubrication tube assembly in a split transmission assembly.
Figure 25:
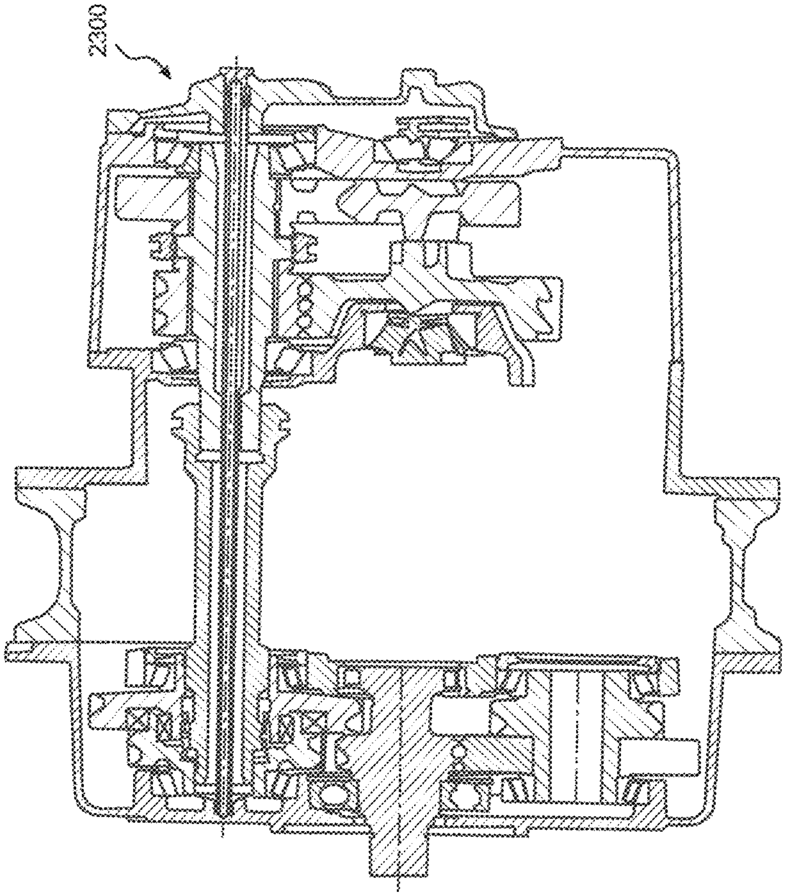

More particularly, FIG. 8 is a side elevation, partial cutaway view of an axle assembly, according to principles of the present disclosure. FIG. 9 is an exploded view of the axle assembly in FIG. 8. FIGS. 10-12 show sequential stages of assembling an axle assembly with a spider structure. FIG. 13 is an isolated view of a covering for the axle assembly. FIG. 14 is an isolated view of a spider structure. FIGS. 15-18 are diagrammatic views of flow through an axle assembly at various positions shown in the clutch table. FIG. 19 is a perspective view of flow through a multistage reduction gear set in a first reduction stage. FIG. 20 is a perspective view of flow through a multistage reduction gear set in a second reduction stage. FIG. 21 is a flow diagram of the axle assembly in second gear. FIG. 22 is a flow diagram of the axle assembly in third gear. FIGS. 23 and 24 show various features of the lubrication tube assembly. FIGS. 25 and 26 are sectional views of a lubrication tube assembly in a split transmission assembly.

As discussed elsewhere herein, the axle assembly 810 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments. In general, the axle assembly (e.g., via a differential assembly) may be configured to transmit torque to vehicle traction wheel assemblies and may permit the traction wheel assemblies to rotate at different velocities. A drive pinion may be coupled to a torque source, such as a vehicle drivetrain component like a motor. Torque that is provided to the drive pinion may be transmitted to another component, such as a ring gear 838. Torque may be transmitted from the ring gear 838 to at least one axle and from an axle to at least one corresponding wheel hub and/or traction wheel assembly. The axle assembly 810 may provide torque to one or more traction wheel assemblies that may include a tire mounted on a wheel. One or more axle assemblies may be provided with the vehicle.

Beginning with more structural components, a housing assembly may receive various components of the axle assembly 810. In examples, the housing assembly may include an axle housing 840 and a carrier 842. In more detail, the axle assembly 810 may include a housing assembly that houses a drive pinion, an electric motor 824, a multistage reduction gear set 826, a shift mechanism 828, a differential assembly 830, and at least one axle shaft. The axle housing 840 may receive and support the axle shafts. The housing assembly may facilitate mounting of the axle assembly 810 to the vehicle.

The electric motor 824 may be spaced apart from the axle housing 840 and may be disposed proximate the differential assembly 830. The electric motor 824 may be electrically coupled to a power source, such as a battery and/or capacitor that may provide and/or store electrical energy. For instance, an electrical connector module (not shown) may be provided with the electric motor 824 to facilitate electrical coupling. The electric motor 824 may provide torque to the drive pinion when an electrical current is received. In addition, the electric motor 824 may generate electrical current in response to rotation of the drive pinion. For example, electrical current may be generated during regenerative braking or when the drive pinion is rotated by a nonelectrical power source, such as an internal combustion engine.

In examples, the electric motor 824 may include a motor housing, a stator, a rotor, a coupling, and a driveshaft. The stator may be fixedly disposed in the motor housing. The motor housing may receive and/or support components of the electric motor 824. The motor housing may be fixedly positioned with respect to differential assembly 830. The stator may be radially disposed about an axis of rotation that may be coincident with a central axis of the driveshaft and may include a plurality of windings as is known by those skilled in the art. The coupling may be fixedly coupled to the driveshaft. For example, the coupling may receive a portion of the driveshaft (e.g., at a splined portion of the driveshaft). A spline may be provided in the first coupling at a through hole that mates with a spline on the driveshaft. As such, the mating splines may cooperate to inhibit rotation of the coupling with respect to the driveshaft. Further, one or more fasteners, such as a washer-nut combination, may be provided to inhibit axial movement of the coupling with respect to the driveshaft. In this regard, a gear portion 899portion of the driveshaft that is opposite the portion received by the first coupling can extend from the motor housing for engagement with a corresponding portion of the drive pinion.

Notably, the drive pinion is shown extending through the carrier as a cross shaft flanking the carrier and extending from a forward side (e.g., from the differential assembly to the electric motor) to the aft side of the axle assembly (e.g., from the differential assembly to the pinion, the transmission, and/or the roller bearing assembly). Under these circumstances, a central axis of a driveshaft of the electric motor can define a first axis (or a driveshaft axis) of the axle assembly. A central axis through the differential assembly along which one or more axles are received can define a second axis (or an axle shaft axis) of the axle assembly. And a central axis of the drive pinion can define a third axis (or a drive pinion axis) of the axle assembly. As shown, the first and third axes are parallelly offset and at an angle (e.g., orthogonal or oblique angle) relative to the second axis. Torque transmission from the electric motor to traction assemblies can occur along these axes (e.g., from the first axis, to the third axis, to the second axis).

In examples, the axle housing 840 may include a center portion 850 and at least one arm portion 852. The center portion 850 may be disposed proximate the center of the axle housing 840. The center portion 850 may define a cavity that may receive the differential assembly 830. As is best shown in FIG. 2, a lower region of the center portion 850 may at least partially define a sump portion that may contain lubricant. Splashed lubricant may flow down the sides of the center portion 850 and may flow over internal components of the axle assembly 810 and gather in the sump portion.

The center portion 850 may include a carrier mounting surface 856. The carrier mounting surface 856 may face toward and may engage the carrier 842. The carrier mounting surface 856 may facilitate mounting of the carrier 842 to the axle housing 840. For example, the carrier mounting surface 856 may have a set of holes that may be aligned with corresponding holes on the carrier 842. Each hole may receive a fastener, such as a bolt, that may couple the carrier 842 to the axle housing 840.

One or more arm portions 852 may extend from the center portion 850. For example, two arm portions 852 may extend in opposite directions from the center portion 850 and away from the differential assembly 830. The arm portions 852 may have substantially similar configurations. For example, the arm portions 852 may each have a hollow configuration or tubular configuration that may extend around the corresponding axle shaft and may help separate or isolate the axle shaft from the surrounding environment. An arm portion 852 or a portion thereof may be integrally formed with the center portion 850. Alternatively, an arm portion 852 may be separate from the center portion 850. In such a configuration, each arm portion 852 may be attached to the center portion 850 in any suitable manner, such as by welding or with one or more fasteners. Each arm portion 852 may define an arm cavity that may receive a corresponding axle shaft. It is also contemplated that the arm portions 852 may be omitted.

The carrier 842, which may also be called a carrier housing, may be mounted to the center portion 850 of the axle housing 840. A carrier cover 866 may be disposed on an end of the carrier 842 that may be disposed opposite the axle housing 840. The carrier 842 may receive the electric motor 824 and may support the differential assembly 830 in at least one cavity. In addition, a carrier cover 866 may be disposed on the carrier 842. For example, the carrier cover 866 may be mounted to interior or exterior surfaces of the axle housing and/or the carrier. Under these circumstances, the carrier cover 866 may be fixedly attached in any suitable manner, such as with one or more carrier cover fasteners, such as bolts. The carrier cover 866 may partially define a junction box that may receive components that may facilitate electrical connections to the electric motor 824. The carrier cover 866 may be provided in various configurations. For example, the carrier cover 866 may enclose an end of the carrier 842 and may not support a multistage reduction gear set 826 in a configuration where a multistage reduction gear set is not provided. Alternatively, the carrier cover 866 may support a multistage reduction gear set 826.

A multistage reduction gear set support 869 may be integrally formed with the differential cover 866. Alternatively, the multistage reduction gear set support 869 may be a separate component from the differential cover 866. For example, the multistage reduction gear set support 869 may be a protrusion of the differential cover 866. The multistage reduction gear set may be attached to the differential cover 866 with a plurality of fasteners (not shown) such as bolts. For example, the fasteners may be arranged around a portion of the multistage reduction gear set and may extend through a portion of the multistage reduction gear set support 869.

Housing assembly 820 may include a cage that covers at least a portion of a pinion assembly 814 to thereby form a portion of an exterior of the housing assembly. For instance, the pinion assembly can include an output shaft 815, one or more bearings 816, and a main shaft 817 that can function as a bearing support and/or a fastener. As shown, the output shaft is forward of the main shaft. The output shaft can engage the differential assembly through the plurality of selectable gear sets and a pinion assembly that is connected at a ring gear 838 of the differential assembly. The plurality of selectable gear sets includes first and second gear sets 827A, 827B. The main shaft has an exterior at which one or more bearings can be mounted. In this manner, the main shaft can function as a bearing support for the one or more bearings. As shown, the main shaft may support a roller bearing assembly that may rotatably support the drive pinion 812. For example, two bearing supports of the main shaft may be received in the cage and may be located proximate opposite sides of the main shaft of the pinion. As it relates to the fastener, the main shaft can have one or more engagement features (e.g., threads to engage a nut, collars to engage a sleeve, knurling for press or shrink fits, etc.).

The bearing support may be provided in various configurations, including different numbers of bearings, one or more sleeves arranged between the main shaft and a bearing, an outer race arranged around the bearing, and the like. When provided, the outer race can be fixedly positioned relative to the cage or otherwise may remain stationary, and the bearing elements of the bearing may rotate along one or more surfaces of the outer race.

More toward the dynamic portions of the axle assembly 810, the drive pinion may provide torque to a ring gear 838 that may be provided with the differential assembly 830. The drive pinion may extend along and may be rotatable about the first axis while the ring gear 838 may be rotatable about a second axis. In examples, the drive pinion may extend through the carrier cover 866.

In examples, the drive pinion may include a spline portion 834, a coupler portion 836 that together form a shaft portion. The coupler portion 836 may be disposed at the coupler portion 836, which may have a plurality of teeth that mate with corresponding teeth on the spline portion. The spline portion 834 may be integrally formed with the corresponding shaft or may be provided as a separate component that may be fixedly disposed on the corresponding shaft. The shaft portion may extend from the e-motor side to the transmission side to be connected to a pinion assembly.

As noted above, the pinion assembly can include an output shaft 815, one or more bearings 816, and a main shaft 817 that can function as a bearing support and/or a fastener. As shown, the output shaft is forward of the main shaft. The output shaft can engage the differential assembly through the plurality of selectable gear sets and a pinion assembly that is connected at a ring gear 838 of the differential assembly. The main shaft has an exterior at which one or more bearings can be mounted. In this manner, the main shaft can function as a bearing support for the one or more bearings. As shown, the main shaft may support a roller bearing assembly that may rotatably support the drive pinion. For example, two bearing supports of the main shaft may be received in the cage and may be located proximate opposite sides of the main shaft of the pinion. As it relates to the fastener, the main shaft can have one or more engagement features (e.g., threads to engage a nut, collars to engage a sleeve, knurling for press or shrink fits, etc.). For instance, a preload nut may be threaded onto threads and may apply a preload force on the main shaft.

The bearing support may be provided in various configurations, including different numbers of bearings, one or more sleeves arranged between the main shaft and a bearing, an outer race arranged around the bearing, and the like. When provided, the outer race can be fixedly positioned relative to the cage or otherwise may remain stationary, and the bearing elements of the bearing may rotate along one or more surfaces of the outer race. In addition, or in alternative, an outer surface of the drive pinion may extend from the coupler portion 836 and may be an outside circumference of a portion of the shaft portion. One or more drive pinion bearings 816 may be disposed on the outer surface and may rotatably support the drive pinion. The drive pinion bearings 874 may have any suitable configuration. For instance, the drive pinion bearings 874 may be configured as roller bearing assemblies that may each include a plurality of rolling elements that may be disposed between an inner race 872 and an outer race 874. The inner race 872 may extend around and may be disposed on the outer surface of the drive pinion. The outer race 874 may extend around the rolling elements. As shown, the outer race 874 may be disposed at the cage and/or at the axle housing. One or more spacer rings 876 may be disposed between the inner races 872 of the drive pinion bearings 874 to inhibit axial movement of the drive pinion bearings 874 toward each other.

One or more bearings supports may be provided by the shaft portion. The bearing supports may be integrally formed with the drive pinion, thereby providing a unitary or one-piece construction. In the figures, two bearings are shown as supported by the shaft portion, although it is contemplated that one bearing support or both bearing supports may be omitted in one or more embodiments. The two bearing supports may have similar configurations. For instance, the bearing supports may be generally configured as mirror images of each other in one or more embodiments. As such, common reference numbers are used to denote features of both bearing supports.

The spline portion 834 may be disposed at a first end of the shaft portion for engagement with the pinion assembly. As shown, the splines may be received by the pinion. In this regard, the coupler portion 836 may be disposed opposite the spline portion 834 for engagement with the driveshaft of the electric motor (e.g., at a corresponding gear portion of the driveshaft). The spline portion 834 may include a plurality of teeth. The teeth may be disposed substantially parallel to the first axis and may mate with corresponding splines in the pinion assembly. Alternatively, the teeth of the spline may mate with a corresponding spline of an adapter that may couple the drive pinion to the pinion, as is the case with other spline- to-spline connections discussed herein.

The electric motor 824 may be operatively connected to the differential assembly 830 and may provide torque to the differential assembly 830 via the drive pinion. As noted above, the electric motor 824 may be spaced apart from the axle housing 840 and may be disposed proximate the differential assembly 830. The electric motor 824 may be electrically coupled to a power source, such as a battery and/or capacitor that may provide and/or store electrical energy. For instance, an electrical connector module (not shown) may be provided with the electric motor 824 to facilitate electrical coupling. The electric motor 824 may provide torque to the drive pinion when an electrical current is received. In addition, the electric motor 824 may generate electrical current in response to rotation of the drive pinion. For example, electrical current may be generated during regenerative braking or when the drive pinion is rotated by a nonelectrical power source, such as an internal combustion engine.

In another example, the electric motor 824 may be received inside the carrier 842. For example, the electric motor 824 may be received in the outer cavity of the carrier 842.

In addition, the electric motor 824 may be axially positioned between the carrier cover 866 and the axle housing 840. As such, the electric motor 824 may be completely received inside of the carrier 842. Positioning the electric motor 824 inside the carrier 842, as opposed to being mounted outside or to an end of the carrier 842, may help further reduce the axial length or standout of the axle assembly 810, which may reduce package space, and may position the center of mass of the axle assembly 810 closer to the axle housing 840 and the second axis, which may help with balancing and mounting of the axle assembly 810.

The axle shafts may transmit torque from the differential assembly 830 to corresponding traction wheel assemblies. For example, two axle shafts may be provided such that each axle shaft extends through a different arm portion 852 of axle housing 840. The axle shafts may extend along and may be rotated about the second axis by the differential assembly 830. Each axle shaft may have a first end and a second end. The first end may be operatively connected to the differential assembly 830. The second end may be disposed opposite the first end and may be operatively connected to a wheel end assembly that may have a wheel hub that may support a wheel.

A multistage reduction gear set can transmit torque along the first, second, and/or third axes at predetermine ratios. As shown, a multistage reduction gear set includes the gear portion of the drive pinion, the gear portion of the driveshaft, and optionally, a planetary gear. Planetary gearing can increase performance when handling heavy haul loads to provide optimum safety and performance in adverse conditions due to the engineering for max traction. Optionally, gear reduction may be provided between an axle shaft and a wheel.

The multistage reduction gear set 826, if provided, may transmit torque from the electric motor 824 to the differential assembly 830. As such, the multistage reduction gear set 826 may be operatively connected to the electric motor 824 and the differential assembly 830. A first gear reduction of the multistage reduction gear set can be achieved at mating gear portions of the driveshaft and the drive pinion. For instance, at this interface, there can be a drive ratio of about 2:1 (e.g., from about +/−1% to +/−15%). This is just one example of the many drive ratios contemplated by this disclosure. It should be noted that any drive ratio can be employed and may be influence by the particular application and/or environment in which the axle assembly is employed.

Further, as noted above, central axis of the driveshaft and drive pinion can be parallelly and/or radially offset. In examples, this offset can occur via a parallelly offset gearbox. The multistage reduction gear set 826 may be provided in various configurations, such as planetary gear set configurations and non-planetary gear set configurations. An example of a multistage reduction gear set 826 that has a planetary gear set configuration is shown. In examples, the amount of offset can be adjustable. For instance, the offset can be calculated based on a variety of factors, including gear ratio and tooth count of gears (e.g., helical gears) of the driveshaft and/or drive pinion. Further, clocking of the offset (e.g., radial position relative to the driveshaft and/or drive pinion) can strategically position the electric motor to be in alignment with the axle. Such alignment can be important for clearances, including ground, brake, and suspension clearance. Clocking and offset can be calculated together and/or be dependent upon similar factors.

The multistage reduction gear set 826 may be primarily disposed outside of the axle housing, thereby providing a modular construction when desired. Such a configuration may allow for a standardized construction of the carrier 842 and/or the electric motor 824. For instance, the multistage reduction gear set 826 may be disposed adjacent to and may be mounted to the carrier cover 866. In addition, the multistage reduction gear set 826 may be primarily received or at least partially received in a gear cavity of the carrier cover 866. As such, the multistage reduction gear set 826 may be primarily disposed outside of the carrier 842.

The shift mechanism can be located between the carrier and the electric motor. The shift mechanism 828 may be disposed at an end of the axle assembly 810 that may be disposed opposite the axle housing 840. For example, the shift mechanism 828 may be disposed on the carrier cover 866. In at least one configuration, splines of the driveshaft may mate with corresponding splines of another component, such as a coupling or shift element that may operatively connect the driveshaft to the power source for driving the drive pinion. For instance, the shift element may extend through components of the multistage reduction gear set 826. In examples, the shift element maybe operatively connected to an actuator. The actuator may move the shift element along the first axis between the first, second, and third positions. For example, the actuator may be coupled to the shift element with the linkage. The actuator may be of any suitable type. For example, the actuator may be an electrical, electromechanical, pneumatic or hydraulic actuator.

The multistage reduction gear set 826 may cooperate with the shift mechanism 828 to provide a desired gear reduction ratio to change the torque provided from the electric motor 824 to the differential assembly 830, and hence to the axle shafts of the axle assembly 810. For example, the multistage reduction gear set 826 may provide a first drive gear ratio and a second drive gear ratio. The first drive gear ratio, which may be referred to as a low range gear ratio, may provide gear reduction from the electric motor 824 to the differential assembly 830 and hence to the axle shafts. As a nonlimiting example, the first drive gear ratio may provide a 2:1 gear ratio or more. The first drive gear ratio may provide increased torque to a vehicle traction wheel as compared to the second drive gear ratio. The second drive gear ratio, which may be referred to as a high range gear ratio, may provide a different gear reduction ratio or lesser gear reduction ratio than the first drive gear ratio. For instance, the second drive gear ratio may provide a 1:1 gear ratio. The second drive gear ratio may facilitate faster vehicle cruising or a cruising gear ratio that may help improve fuel economy. In addition, a neutral drive gear ratio or neutral position may be provided in which torque may not be provided to the differential assembly 830 by the electric motor 824.

An electronic controller may control operation of the actuator and hence movement of the shift element. An example of shifting of the shift element will now be discussed in the context of an axle assembly 810 that has a multistage reduction gear set 826 having a planetary gear configuration. Starting with the shift element in the first position, the electronic controller may receive one or more inputs that may be indicative of speed (e.g., rotational speed of the rotor) and/or torque (e.g., torque provided by the electric motor). Shifting of the shift element from the first position to the second position or neutral position may be commenced when the speed and/or torque exceed predetermined threshold levels. Torque on the shift element may be temporarily relieved or reduced by controlling the rotational speed of the electric motor so that the shift element may more easily be actuated from the first position to the second position. The shift element may then be actuated from the second position to the third position. More specifically, the rotational speed of the shift element may be synchronized with the rotational speed of the sun gear and then the actuator may be controlled to move the shift element from the second position to the third position. The steps may be generally reversed to move the shift element from the third position to the first position. For instance, torque on the shift element may be temporarily relieved or reduced to allow the shift element to move from the third position to the second position and rotational speed of the shift element and a corresponding gear may be synchronized to allow the shift element.

The axle assembly described above may allow an electric motor to be assembled to or retrofitted on an existing axle housing. In addition, a multistage reduction gear set or multistage reduction gear set accompanied by a shift mechanism may optionally be provided to provide gear reduction that may improve vehicle traction at low speeds or on increased road grades. The modular end-to-end positioning of the multistage reduction gear set and the shift mechanism may allow multistage reduction gear sets and shift mechanisms to be added to or removed from an axle assembly to meet operating conditions or performance requirements. Moreover, the modular construction may allow components such as the carrier, carrier cover, and shift mechanism housing to be made of a lighter weight material, such as aluminum, as compared to the axle housing, which may help reduce weight and improve fuel economy. The removable end plate may also allow the axle assembly to be coupled to a driveshaft which may allow the axle assembly to be provided as part of a parallel hybrid driveline rather than an all-electric configuration.

FIGS. 23 through 26 illustrate various views and structural configurations of a lubrication system for an axle assembly, including a coaxial, nested-conduit lubrication tube assembly configured to supply lubricant to gear sets and internal rotating components in both electric motor and transmission-side housing portions of the assembly.

FIG. 23 depicts an exploded perspective view of a lubrication tube assembly 2300, which includes a lubrication tube 2305 having nested conduits 2350 (i.e., pipe-in-pipe configuration), a feeder 2340, and a manifold 2325. The figure shows the relative positioning of each component and the integration of a supply circuit 2345 and channel 2330 for directing oil flow to both inner and outer conduits. In this view, the first conduit perforated section 2310 and second conduit perforated section 2320 are arranged to deliver working fluid to respective gear sets located on opposite ends of the cross shaft.

FIG. 24 illustrates a side cross-sectional view of the assembled lubrication tube assembly 2300, further highlighting the concentric relationship between the inner and outer conduits 2350. This view also details the interaction between the feeder 2340, manifold 2325, and the bore that houses the lubrication tube 2305, including the use of stepped bore geometry and radial perforations for distributing lubricant into the two flow paths. The figure emphasizes how the coaxial structure enables simultaneous delivery of lubricant to distant and proximal components across the axle's cross shaft axis.

FIG. 25 shows a transverse cross-sectional view of the lubrication tube assembly 2300 situated within the electric motor-side housing of the axle assembly. This figure illustrates the radial orientation of the first conduit 2350 and second conduit 2350, and their alignment with lubrication zones in the e-motor side. The view provides a clear representation of how the inner conduit supplies lubricant to deeper or distal gear sets, while the outer conduit addresses more proximal lubrication points within the e-motor housing.

FIG. 26 presents a cutaway detail of the cross-section shown in FIG. 25, providing additional clarity on the internal structure of the lubrication tube 2305. This cutaway emphasizes the nested pipe relationship, the flow paths within each conduit 2350, and the configuration of the perforations that facilitate lubricant dispersion at targeted positions within the motor housing. The figure helps illustrate how the design maintains a balanced pressure and flow rate to both sides of the axle assembly.

In one general aspect, lubrication tube assembly 2300 may include a lubrication tube 2305 composed of interconnected nested conduits 2350, the lubrication tube 2305 including: a first conduit 2350 having a first conduit perforated section 2310 at a first end of the lubrication tube 2305 for supplying a working fluid to one of the first and second gear sets 27A and 827B, and a second conduit 2350 having a second conduit perforated section 2320 at a second end of the lubrication tube 2305 for supplying the working fluid to the other of the first and second gear sets. The first and second ends of the lubrication tube 2305 are opposing ends. Lubrication tube assembly 2300 also includes a feeder 2340 configured to distribute a supply of the working fluid to the lubrication tube 2305 for both the first conduit 2350 and second conduit 2350.

In some implementations, the lubrication tube 2305 includes a coaxial pipe-in-pipe arrangement, where one conduit (e.g., inner pipe) is disposed within the other (e.g., outer pipe), referred to as a "pipe over pipe" design. This configuration enables parallel and balanced delivery of oil to multiple lubrication points located along a shaft structure. The feeder 2340 connects to a single pressure channel that originates from an oil pump and feeds both conduits 2350 simultaneously, helping ensure equal oil distribution to all lubrication points regardless of their distance from the pump.

Implementations may include one or more of the following features. Lubrication tube assembly 2300 in which the first conduit 2350 and second conduit 2350 are concentric and fluidly isolated, configured to independently deliver lubricant to different lubrication zones while sharing the same pressure source. The first conduit 2350 includes multiple perforations along a longer supply length leading toward the e-motor-side housing to lubricate components such as bearings and splines. The second conduit 2350, being shorter, delivers oil toward the carrier housing (transmission side), where the oil flow path is shorter and more direct. This configuration mitigates oil flow imbalance caused by pressure drops along a single, long pipe with multiple orifice holes.

Lubrication tube assembly 2300 thus facilitates uniform distribution of the working fluid by segmenting the supply paths via separate inner and outer conduits 2350. The first conduit 2350 supplies lubricant to a first gear set (e.g., a reduction gear set on the e-motor side), while the second conduit 2350 supplies lubricant to a second gear set (e.g., selectable gears in a split transmission on the carrier side). The second conduit 2350 has a shorter length than the first conduit 2350, allowing for optimized flow dynamics and pressure management. Both conduits 2350 include their respective perforated sections 2310, 2320 that align with lubrication points such as bearings and splines, ensuring even fluid delivery regardless of conduit length.

The feeder 2340 may include a stepped geometry that fluidly connects with both conduits 2350 and includes axially and rotationally spaced perforations. The feeder 2340 may interface with a manifold 2325 that houses a supply circuit 2345, and a bore that receives the lubrication tube 2305. The bore may have a first bore portion and a second bore portion with differing diameters and may form a channel 2330 to deliver oil to the outer conduit 2350. The second end of the lubrication tube 2305 may fit fluid-tightly into or around the stepped portion of the feeder 2340.

In one general aspect, a method includes supplying lubricant to multiple perforated sections 2310, 2320 positioned at opposing ends of a concentric lubrication tube 2305 spanning between an e-motor-side housing and a transmission-side carrier housing of an axle assembly. The method includes supplying oil to both conduits 2350 through a single feeder 2340 and pressure channel, ensuring that perforated sections 2310, 2320 at both ends receive substantially equal amounts of lubricant.

Implementations of the method include partitioning a supply of lubricant through the feeder 2340 that directs flow into both the inner and outer conduits 2350 of the lubrication tube 2305. The feeder 2340 receives oil from a single pressure channel connected to an oil pump and divides the supply to ensure consistent flow distribution across long and short paths, thereby equalizing lubrication amounts at distant and proximal lubrication points, such as those found along a main shaft and an output shaft of the e-motor.

In one general aspect, an axle assembly may include a housing that forms an exterior and interior of the axle assembly. The housing includes an axle collar for receiving an axle along an axle axis that defines an e-motor side at which an electric motor is connectible and a transmission side for housing a split transmission assembly. The split transmission includes a cross shaft that connects a multistage reduction gear set at the e-motor side to selectable gear sets on the transmission side. The cross shaft includes a main shaft and an output shaft forming a cross shaft axis.

The axle assembly includes an oil pump configured to deliver lubricant to internal components. A lubrication tube assembly 2300 received within the cross shaft includes nested conduits 2350 (pipe-in-pipe configuration) designed to supply similar amounts of lubricant to multiple lubrication points, such as bearings and splines. These lubrication points span both the e-motor and transmission sides, and the nested design compensates for pressure loss differences caused by variable conduit lengths.

The lubrication tube assembly 2300 includes a feeder assembly having the manifold 2325 and feeder 2340 that distribute oil from a single supply circuit 2345 to both the inner and outer conduits 2350 of the lubrication tube 2305. The assembly ensures consistent oil delivery across all lubrication zones despite the differences in conduit lengths. Lubrication targets include the bearings of the cross shaft and gear meshes in the transmission side. The manifold 2325 is fixed to the axle housing and channels oil through a stepped feeder 2340 into both conduits 2350, maintaining pressure balance and oil volume equivalence.

Perhaps best understood in the context of specific examples, several example implementations are provided hereinbelow as follows:

The following description provides additional examples of the systems, methods, and assemblies described throughout this disclosure. Although specific figures are not expressly referenced in the discussion below, it should be understood that the technical elements described earlier—whether shown in figures or detailed in prior paragraphs—are applicable to these embodiments individually and collectively. The concepts disclosed herein are representative of a broader range of variations and configurations, and are intended to exemplify, not limit, the inventive subject matter.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

In one general aspect, a split transmission assembly may include an electric motor proximal side configured to interface with the electric motor and house a first gear set of the plurality of gear sets. The split transmission assembly may also include an electric motor distal side that is arranged opposite to the electric motor proximal side and configured to support second and third gear sets of the split transmission assembly. The assembly may furthermore include a differential section arranged between the electric motor proximal and distal sides, the differential section being configured to receive at least one axle of the axle assembly. The assembly may also include a first gear set that is a multistage reduction gear set configured to cooperate with the second and third gear sets to provide at least three distinct ratios. Other embodiments of this aspect include corresponding computer systems, apparatus, and computer programs recorded on one or more computer storage devices, each configured to perform the actions of the methods.

Implementations may include one or more of the following features. The multistage reduction gear set may be a double reduction gear set. The split transmission assembly may include a shifting assembly that is configured to cause the first, second, and third gear sets to cooperate, where the multistage reduction gear set includes a compound idler gear. The compound idler gear may have first and second idler gears, with the first idler gear positioned outboard of the second and having a smaller diameter. The shifting assembly may be configured to cause the multistage reduction gear set to cooperate with the second and third gear sets to provide the distinct ratios. Shifting may be achieved using a plurality of clutch elements, where shifting between adjacent gears is possible via a single clutch movement. The at least three ratios may include a first ratio approximately double the second, and the second approximately double the third. The ratios may further include multiple neutral positions. Each of the first and second ratios may be achievable with the multistage reduction gear set in a first reduction stage, and the third ratio achievable in a second, distinct reduction stage. The first ratio may result from the multistage reduction gear set cooperating with the second gear set, the second ratio with the third gear set, and the third ratio with the third gear set in the second reduction stage. The plurality of clutch elements may be located on the electric motor distal side, and may include a first set associated with the first gear set and located at the electric motor proximal side, and a second set associated with the second and/or third gear sets located on the electric motor distal side. The split transmission assembly may include one or more cross shafts operatively connecting the first gear set to the second gear set. The width of the electric motor distal side may be approximately equal to the width of the electric motor proximal side.

In one general aspect, a method may include selecting a reduction stage of a multistage reduction gear set in a split transmission assembly to provide a selected reduction stage, the split transmission assembly being longitudinally split across the e-axle assembly. The method may also include selecting, corresponding to the selected reduction stage, a selected gear set from a plurality of selectable gear sets in the split transmission assembly such that the selected reduction stage cooperates with the selected gear set to provide one of at least three distinct ratios. Other embodiments of this aspect include corresponding computer systems, apparatus, and computer programs recorded on one or more computer storage devices, each configured to perform the actions of the methods.

Implementations may include one or more of the following features. Selecting both the reduction stage and the gear set may be achieved by movement of a single clutch element.

In one general aspect, an axle assembly may include an axle housing configured to house internal components of the axle assembly and connect to an electric motor at an electric motor proximal side. The axle assembly may also include a transmission assembly operatively mounted to the electric motor and configured to be powered thereby. The transmission assembly may be a split transmission with gear sets arranged on both the electric motor proximal and distal sides. The assembly may further include a shifting assembly for shifting between gears, and a differential assembly for transmitting torque from the transmission to at least one axle. The first gear set may be a multistage reduction gear set arranged at the electric motor proximal side, configured to cooperate with second and third gear sets arranged at the distal side to provide at least three distinct ratios.

Implementations may include one or more of the following features. The axle assembly may include an electric motor operatively attached to the transmission assembly. The at least three ratios may include four total ratios, of which three are selectable, and shifting may be facilitated by movement of at least six clutch elements. The four ratios may include a first, second, third, and fourth ratio, where the first is greater than the second, the second greater than the third, and the fourth acts as a second neutral between the second and third.

A system of one or more computers can be configured to perform particular operations by having installed software, firmware, hardware, or combinations thereof that, when executed, cause the system to carry out the operations. One or more computer programs may also include instructions that, when executed, perform the same.

In one general aspect, a carriage may include a transmission assembly configured to operatively mount to an electric motor and be powered thereby. The carriage may also include a shifting assembly for gear selection, and a differential assembly for transmitting torque to at least one axle.

Implementations may include one or more of the following features. The carriage housing structure 841 may include an alignment feature 920, which is best shown in FIGS. 8 and 9, for positioning the carriage housing structure 841 relative to the axle assembly and/or the electric motor. The alignment feature 920 may be a protrusion projecting from the outer surface of the carriage body, possibly formed as a partial annulus centered about an input shaft axis at the electric motor proximal side. The alignment feature 920 may be received in a recess 922 in the axle housing 840 as is best shown in FIG. 8. The alignment feature 920 may be shaped to complement and mate with the electric motor, and may be insertable therein. The carriage body may support transmission bearings, such as first, second, and third bearings 950, 952, 954, which are best shown in FIG. 9, that rotatably support first, second, and third shafts 940, 942, 944 of the transmission, and input shaft loads independently from the axle housing.

The carriage body may include: an electric motor proximal side configured to interface with the electric motor and support a first gear set; an electric motor distal side supporting a second gear set; and a differential section arranged between the two, configured to receive at least one axle and connected to the proximal side via one or more differential section legs. The carriage may be formed as a cartridge or a spider structure 960', where a cartridge provides a structural housing that, once connected to the axle housing, encloses the internal components. A non-structural cover may be added to fluidly seal and enclose the internal components with the axle housing.

In one general aspect, a method may include connecting internal components of an axle assembly to a carriage to form a carriage assembly that is unitarily connectable to an axle housing. The internal components may include a transmission assembly, a shifting assembly, and a differential assembly. The method may also include connecting the carriage assembly to the axle housing.

Implementations may include one or more of the following features. The carriage assembly may comprise a spider structure 960' that supports internal component loads, including gear and shaft bearing loads. A lightweight cover may fluidly seal the spider structure 960' with the axle housing. The method may also include aligning the carriage assembly to the electric motor using the alignment feature of the carriage.

In one general aspect, an axle assembly may include a transmission assembly operatively mounted to and powered by an electric motor. The axle assembly may also include a shifting assembly and a differential assembly configured to transmit torque to at least one axle.

Implementations of the described techniques may include hardware, a method or process, or a computer tangible medium.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the term “set” is intended to include one or more items (e.g., related items, unrelated items, a combination of related and unrelated items, and/or the like), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. An axle assembly comprising:

an axle housing, the axle housing comprising an arm portion that is configured to receive an axle shaft; and a cartridge housing structure that extends from the axle housing and is partially received inside the axle housing, the cartridge housing structure comprising:

a carrier housing that is mounted to the axle housing, the carrier housing comprising a gear set support;

a differential assembly that is supported by the carrier housing; and a transmission that comprises first, second, and third shafts;

wherein the gear set support comprises first, second, and third holes that receive the first, second, and third shafts, respectively.

2. The axle assembly of claim 1, further comprising an alignment feature, wherein the alignment feature is provided with the gear set support, mates with the axle housing, and positions the cartridge housing structure with respect to the axle housing.

3. The axle assembly of claim 2, wherein the alignment feature comprises a protrusion that is received in a recess in the axle housing.

4. The axle assembly of claim 3, wherein the protrusion is arranged about the first opening.

5. The axle assembly of claim 4, wherein the protrusion circles the first shaft.

6. The axle assembly of claim 5, further comprising an electric motor that is mounted to the axle housing, wherein the electric motor is connected to the first shaft.

7. The axle assembly of claim 2, wherein the alignment feature is received inside the axle housing.

8. The axle assembly of claim 7, wherein the alignment feature encircles the first hole in the gear set support through which the first shaft extends.

9. The axle assembly of claim 1, wherein the cartridge housing structure is configured to support transmission bearing loads without structural assistance from the axle housing.

10. The axle assembly of claim 1 wherein the first, second, and third holes of the gear set support receive first, second, and third bearings, that rotatably support the first, second, and third shafts, respectively.

11. An axle assembly comprising:

an axle housing, the axle housing comprising an arm portion that is configured to receive an axle shaft; and a cartridge housing structure that extends from the axle housing and is partially received inside the axle housing, the cartridge housing structure comprising:

a spider structure that extends from the axle housing and is partially received inside the axle housing;

a differential assembly that is supported by the spider structure; and a transmission that is supported by the spider structure, the transmission comprising first and second shafts;

wherein the spider structure comprises first, second, and third holes that are disposed outside the axle housing and a plurality of legs that extend between the first, second, and third holes and the axle housing; and a cover that extends from the axle housing and inside which the first, second, and third holes and the plurality of legs of the spider structure are disposed.

12. The axle assembly of claim 11 wherein a portion of the spider structure extends into the axle housing and supports the differential assembly.

13. The axle assembly of claim 11 wherein the cover is fluidly sealed to the axle housing.

14. The axle assembly of claim 11 wherein a first shaft of the transmission extends into the first hole.

15. The axle assembly of claim 14 wherein a second shaft of the transmission extends into the second hole.

16. The axle assembly of claim 11 further comprising an electric motor that is mounted to the axle housing.

* * * * *